US008046841B2

(12) United States Patent
Moskowitz et al.

(10) Patent No.: US 8,046,841 B2
(45) Date of Patent: *Oct. 25, 2011

(54) STEGANOGRAPHIC METHOD AND DEVICE

(75) Inventors: Scott A. Moskowitz, Sunny Isles Beach, FL (US); Marc Cooperman, Short Hills, NJ (US)

(73) Assignee: Wistaria Trading, Inc., Sunny Isles Beach, FL (US)

( * ) Notice: Subject to any disclaimer, the term of this patent is extended or adjusted under 35 U.S.C. 154(b) by 293 days.

This patent is subject to a terminal disclaimer.

(21) Appl. No.: 11/894,476

(22) Filed: Aug. 21, 2007

(65) Prior Publication Data

US 2007/0294536 A1  Dec. 20, 2007

Related U.S. Application Data

(60) Continuation of application No. 08/999,766, filed on Jul. 23, 1997, now Pat. No. 7,568,100, which is a division of application No. 08/775,216, filed on Dec. 31, 1996, now Pat. No. 5,687,236, which is a continuation of application No. 08/489,172, filed on Jun. 7, 1995, now Pat. No. 5,613,004.

(51) Int. Cl.
*G06F 9/30* (2006.01)
(52) U.S. Cl. ............. 726/32; 713/176; 705/57; 380/231
(58) Field of Classification Search .................. 380/203, 380/231, 230; 705/57; 713/176; 726/32
See application file for complete search history.

(56) References Cited

U.S. PATENT DOCUMENTS

| | | | |
|---|---|---|---|
| 3,947,825 A | 3/1976 | Cassada |
| 3,984,624 A | 10/1976 | Waggener |
| 3,986,624 A | 10/1976 | Cates, Jr. et al. |
| 4,038,596 A | 7/1977 | Lee |
| 4,200,770 A | 4/1980 | Hellman et al. |
| 4,218,582 A | 8/1980 | Hellman et al. |
| 4,339,134 A | 7/1982 | Macheel |
| 4,390,898 A | 6/1983 | Bond et al. |
| 4,405,829 A | 9/1983 | Rivest et al. |
| 4,424,414 A | 1/1984 | Hellman et al. |
| 4,528,588 A | 7/1985 | Lofberg |
| 4,672,605 A | 6/1987 | Hustig et al. |
| 4,748,668 A | 5/1988 | Shamir et al. |
| 4,789,928 A | 12/1988 | Fujisaki |
| 4,827,508 A | 5/1989 | Shear |
| 4,876,617 A | 10/1989 | Best et al. |
| 4,896,275 A | 1/1990 | Jackson |
| 4,908,873 A | 3/1990 | Philibert et al. |
| 4,939,515 A | 7/1990 | Adelson |
| 4,969,204 A | 11/1990 | Melnychuck et al. |
| 4,972,471 A | 11/1990 | Gross et al. |
| 4,977,594 A | 12/1990 | Shear |
| 4,979,210 A | 12/1990 | Nagata et al. |
| 4,980,782 A | 12/1990 | Ginkel |
| 5,050,213 A | 9/1991 | Shear |
| 5,073,925 A | 12/1991 | Nagata et al. |
| 5,077,665 A | 12/1991 | Silverman et al. |
| 5,113,437 A | 5/1992 | Best et al. |
| 5,136,581 A | 8/1992 | Muehrcke |
| 5,136,646 A | 8/1992 | Haber et al. |
| 5,136,647 A | 8/1992 | Haber et al. |
| 5,142,576 A | 8/1992 | Nadan |
| 5,161,210 A | 11/1992 | Druyvesteyn et al. |
| 5,210,820 A | 5/1993 | Kenyon |
| 5,243,423 A | 9/1993 | DeJean et al. |
| 5,243,515 A | 9/1993 | Lee |
| 5,287,407 A | 2/1994 | Holmes |
| 5,319,735 A | 6/1994 | Preuss et al. |
| 5,341,429 A | 8/1994 | Stringer et al. |
| 5,341,477 A | 8/1994 | Pitkin et al. |
| 5,363,448 A | 11/1994 | Koopman et al. |
| 5,365,586 A | 11/1994 | Indeck et al. |
| 5,369,707 A | 11/1994 | Follendore, III |
| 5,379,345 A | 1/1995 | Greenberg |
| 5,394,324 A | 2/1995 | Clearwater |
| 5,398,285 A | 3/1995 | Borgelt et al. |
| 5,406,627 A | 4/1995 | Thompson et al. |
| 5,408,505 A | 4/1995 | Indeck et al. |
| 5,410,598 A | 4/1995 | Shear |
| 5,412,718 A | 5/1995 | Narasimhalv et al. |

(Continued)

FOREIGN PATENT DOCUMENTS

EP  0372601  6/1990

(Continued)

OTHER PUBLICATIONS

European Search Report & European Search Opinion, completed Oct. 15, 2007; authorized officer James Hazel (EP 07 11 2420) (9 pages).
Staind (The Singles 1996-2006), Warner Music—Atlantic, Pre-Release CD image, 2006, 1 page.
Arctic Monkeys (Whatever People Say I Am, That's What I'm Not), Domino Recording Co. Ltd., Pre-Released CD image, 2005, 1 page.
Radiohead ("Hail to the Thief"), EMI Music Group—Capitol, Pre-Release CD image, 2003, 1 page.
PCT International Search Report, completed Sep. 13, 1995; authorized officer Huy D. Vu (PCT/US95/08159) (2 pages).
PCT International Search Report, completed Jun. 11, 1996; authorized officer Salvatore Cangialosi (PCT/US96/10257) (4 pages).
Supplementary European Search Report, completed Mar. 5, 2004; authorized officer J. Hazel (EP 96 91 9405) (1 page).

(Continued)

*Primary Examiner* — Matthew Smithers
*Assistant Examiner* — Paul Callahan
(74) *Attorney, Agent, or Firm* — Neifeld IP Law, PC

(57) ABSTRACT

An apparatus and method for encoding and decoding additional information into a stream of digitized samples in an integral manner. The information is encoded using special keys. The information is contained in the samples, not prepended or appended to the sample stream. The method makes it extremely difficult to find the information in the samples if the proper keys are not possessed by the decoder. The method does not cause a significant degradation to the sample stream. The method is used to establish ownership of copyrighted digital multimedia content and provide a disincentive to piracy of such material.

99 Claims, No Drawings

U.S. PATENT DOCUMENTS

| | | |
|---|---|---|
| 5,418,713 A | 5/1995 | Allen |
| 5,428,606 A | 6/1995 | Moskowitz |
| 5,450,490 A | 9/1995 | Jensen et al. |
| 5,469,536 A | 11/1995 | Blank |
| 5,471,533 A | 11/1995 | Wang et al. |
| 5,478,990 A | 12/1995 | Montanari et al. |
| 5,479,210 A | 12/1995 | Cawley et al. |
| 5,487,168 A | 1/1996 | Geiner et al. |
| 5,493,677 A | 2/1996 | Balogh et al. |
| 5,497,419 A | 3/1996 | Hill |
| 5,506,795 A | 4/1996 | Yamakawa |
| 5,513,126 A | 4/1996 | Harkins et al. |
| 5,513,261 A | 4/1996 | Maher |
| 5,530,739 A | 6/1996 | Okada |
| 5,530,751 A | 6/1996 | Morris |
| 5,530,759 A | 6/1996 | Braudaway et al. |
| 5,539,735 A | 7/1996 | Moskowitz |
| 5,548,579 A | 8/1996 | Lebrun et al. |
| 5,568,570 A | 10/1996 | Rabbani |
| 5,579,124 A | 11/1996 | Aijala et al. |
| 5,581,703 A | 12/1996 | Baugher et al. |
| 5,583,488 A | 12/1996 | Sala et al. |
| 5,598,470 A | 1/1997 | Cooper et al. |
| 5,606,609 A | 2/1997 | Houser et al. |
| 5,613,004 A | 3/1997 | Cooperman et al. |
| 5,617,119 A | 4/1997 | Briggs et al. |
| 5,625,690 A | 4/1997 | Michel et al. |
| 5,629,980 A | 5/1997 | Stefik et al. |
| 5,633,932 A | 5/1997 | Davis et al. |
| 5,634,040 A | 5/1997 | Her et al. |
| 5,636,276 A | 6/1997 | Brugger |
| 5,636,292 A | 6/1997 | Rhoads |
| 5,640,569 A | 6/1997 | Miller et al. |
| 5,646,997 A | 7/1997 | Barton |
| 5,657,461 A | 8/1997 | Harkins et al. |
| 5,659,726 A | 8/1997 | Sandford, II et al. |
| 5,664,018 A | 9/1997 | Leighton |
| 5,673,316 A | 9/1997 | Auerbach et al. |
| 5,677,952 A | 10/1997 | Blakley et al. |
| 5,680,462 A | 10/1997 | Miller et al. |
| 5,687,236 A | 11/1997 | Moskowitz et al. |
| 5,689,587 A | 11/1997 | Bender et al. |
| 5,696,828 A | 12/1997 | Koopman, Jr. |
| 5,719,937 A | 2/1998 | Warren et al. |
| 5,721,788 A | 2/1998 | Powell et al. |
| 5,734,752 A | 3/1998 | Knox |
| 5,737,416 A | 4/1998 | Cooper et al. |
| 5,737,733 A | 4/1998 | Eller |
| 5,740,244 A | 4/1998 | Indeck et al. |
| 5,745,569 A | 4/1998 | Moskowitz et al. |
| 5,748,783 A | 5/1998 | Rhoads |
| 5,751,811 A | 5/1998 | Koopman, Jr. |
| 5,754,697 A | 5/1998 | Fu et al. |
| 5,757,923 A | 5/1998 | Koopman, Jr. |
| 5,765,152 A | 6/1998 | Erickson |
| 5,768,396 A | 6/1998 | Sone |
| 5,774,452 A | 6/1998 | Wolosewicz |
| 5,790,677 A | 8/1998 | Fox et al. |
| 5,799,083 A | 8/1998 | Brothers et al. |
| 5,809,139 A | 9/1998 | Grirod et al. |
| 5,809,160 A | 9/1998 | Powell et al. |
| 5,818,818 A | 10/1998 | Soumiya |
| 5,822,432 A | 10/1998 | Moskowitz et al. |
| 5,828,325 A | 10/1998 | Wolosewicz et al. |
| 5,832,119 A | 11/1998 | Rhoads |
| 5,842,213 A | 11/1998 | Odom |
| 5,848,155 A | 12/1998 | Cox |
| 5,850,481 A | 12/1998 | Rhoads |
| 5,859,920 A | 1/1999 | Daly et al. |
| 5,860,099 A | 1/1999 | Milios et al. |
| 5,862,260 A | 1/1999 | Rhoads |
| 5,870,474 A | 2/1999 | Wasilewski et al. |
| 5,884,033 A | 3/1999 | Duvall et al. |
| 5,889,868 A | 3/1999 | Moskowitz et al. |
| 5,893,067 A | 4/1999 | Bender et al. |
| 5,894,521 A | 4/1999 | Conley |
| 5,903,721 A | 5/1999 | Sixtus |
| 5,905,800 A | 5/1999 | Moskowitz et al. |
| 5,905,975 A | 5/1999 | Ausubel |
| 5,912,972 A | 6/1999 | Barton |
| 5,915,027 A | 6/1999 | Cox et al. |
| 5,917,915 A | 6/1999 | Hirose |
| 5,918,223 A | 6/1999 | Blum |
| 5,920,900 A | 7/1999 | Poole et al. |
| 5,923,763 A | 7/1999 | Walker et al. |
| 5,930,369 A | 7/1999 | Cox et al. |
| 5,930,377 A | 7/1999 | Powell et al. |
| 5,940,134 A | 8/1999 | Wirtz |
| 5,943,422 A | 8/1999 | Van Wie et al. |
| 5,949,055 A | 9/1999 | Fleet |
| 5,963,909 A | 10/1999 | Warren et al. |
| 5,973,731 A | 10/1999 | Schwab |
| 5,974,141 A | 10/1999 | Saito |
| 5,991,426 A | 11/1999 | Cox et al. |
| 5,999,217 A | 12/1999 | Berners-Lee |
| 6,009,176 A | 12/1999 | Gennaro et al. |
| 6,029,126 A | 2/2000 | Malvar |
| 6,041,316 A | 3/2000 | Allen |
| 6,044,471 A | 3/2000 | Colvin |
| 6,049,838 A | 4/2000 | Miller et al. |
| 6,051,029 A | 4/2000 | Paterson et al. |
| 6,061,793 A | 5/2000 | Tewfik et al. |
| 6,067,622 A | 5/2000 | Moore |
| 6,069,914 A | 5/2000 | Cox |
| 6,078,664 A | 6/2000 | Moskowitz et al. |
| 6,081,251 A | 6/2000 | Sakai et al. |
| 6,081,587 A | 6/2000 | Reyes et al. |
| 6,081,597 A | 6/2000 | Hoffstein |
| 6,088,455 A | 7/2000 | Logan et al. |
| 6,131,162 A | 10/2000 | Yoshiura et al. |
| 6,141,753 A | 10/2000 | Zhao et al. |
| 6,141,754 A | 10/2000 | Choy |
| 6,148,333 A | 11/2000 | Guedalia |
| 6,154,571 A | 11/2000 | Cox et al. |
| 6,192,138 B1 | 2/2001 | Yamadaji |
| 6,199,058 B1 | 3/2001 | Wong et al. |
| 6,205,249 B1 | 3/2001 | Moskowitz |
| 6,208,745 B1 | 3/2001 | Florencio et al. |
| 6,226,618 B1 | 5/2001 | Downs |
| 6,230,268 B1 | 5/2001 | Miwa et al. |
| 6,233,347 B1 | 5/2001 | Chen et al. |
| 6,233,684 B1 | 5/2001 | Stefik et al. |
| 6,240,121 B1 | 5/2001 | Senoh |
| 6,263,313 B1 | 7/2001 | Milstead et al. |
| 6,272,634 B1 | 8/2001 | Tewfik et al. |
| 6,275,988 B1 | 8/2001 | Nagashima et al. |
| 6,278,780 B1 | 8/2001 | Shimada |
| 6,278,791 B1 | 8/2001 | Honsinger et al. |
| 6,282,300 B1 | 8/2001 | Bloom et al. |
| 6,282,650 B1 | 8/2001 | Davis |
| 6,285,775 B1 | 9/2001 | Wu et al. |
| 6,301,663 B1 | 10/2001 | Kato et al. |
| 6,310,962 B1 | 10/2001 | Chung et al. |
| 6,330,335 B1 | 12/2001 | Rhoads |
| 6,330,672 B1 | 12/2001 | Shur |
| 6,345,100 B1 | 2/2002 | Levine |
| 6,351,765 B1 | 2/2002 | Pietropaolo et al. |
| 6,363,483 B1 | 3/2002 | Keshav |
| 6,373,892 B1 | 4/2002 | Ichien et al. |
| 6,373,960 B1 | 4/2002 | Conover et al. |
| 6,374,036 B1 | 4/2002 | Ryan et al. |
| 6,377,625 B1 | 4/2002 | Kim |
| 6,381,618 B1 | 4/2002 | Jones et al. |
| 6,381,747 B1 | 4/2002 | Wonfor et al. |
| 6,385,324 B1 | 5/2002 | Koppen |
| 6,385,329 B1 | 5/2002 | Sharma et al. |
| 6,385,596 B1 | 5/2002 | Wiser |
| 6,389,538 B1 | 5/2002 | Gruse et al. |
| 6,405,203 B1 | 6/2002 | Collart |
| 6,415,041 B1 | 7/2002 | Oami et al. |
| 6,418,421 B1 | 7/2002 | Hurtado |
| 6,425,081 B1 | 7/2002 | Iwamura |
| 6,430,301 B1 | 8/2002 | Petrovic |
| 6,430,302 B2 | 8/2002 | Rhoads |
| 6,442,283 B1 | 8/2002 | Tewfik et al. |
| 6,446,211 B1 | 9/2002 | Colvin |
| 6,453,252 B1 | 9/2002 | Laroche |

| | | | | | | |
|---|---|---|---|---|---|---|
| 6,457,058 | B1 | 9/2002 | Ullum et al. | 7,346,472 B1 | 3/2008 | Moskowitz et al. |
| 6,463,468 | B1 | 10/2002 | Buch et al. | 7,362,775 B1 | 4/2008 | Moskowitz |
| 6,484,264 | B1 | 11/2002 | Colvin | 7,363,278 B2 | 4/2008 | Schmelzer et al. |
| 6,493,457 | B1 | 12/2002 | Quackenbush | 7,409,073 B2 | 8/2008 | Moskowitz et al. |
| 6,502,195 | B1 | 12/2002 | Colvin | 7,457,962 B2 | 11/2008 | Moskowitz |
| 6,522,767 | B1 | 2/2003 | Moskowitz et al. | 7,460,994 B2 | 12/2008 | Herre et al. |
| 6,522,769 | B1 | 2/2003 | Rhoads et al. | 7,475,246 B1 | 1/2009 | Moskowitz |
| 6,523,113 | B1 | 2/2003 | Wehrenberg | 7,530,102 B2 | 5/2009 | Moskowitz |
| 6,530,021 | B1 | 3/2003 | Epstein et al. | 7,532,725 B2 | 5/2009 | Moskowitz et al. |
| 6,532,284 | B2 | 3/2003 | Walker et al. | 7,568,100 B1 * | 7/2009 | Moskowitz et al. .......... 713/176 |
| 6,539,475 | B1 | 3/2003 | Cox et al. | 7,647,502 B2 | 1/2010 | Moskowitz |
| 6,557,103 | B1 | 4/2003 | Boncelet, Jr. et al. | 7,647,503 B2 | 1/2010 | Moskowitz |
| 6,584,125 | B1 | 6/2003 | Katto | 7,664,263 B2 | 2/2010 | Moskowitz |
| 6,587,837 | B1 | 7/2003 | Spagna et al. | 7,743,001 B1 | 6/2010 | Vermeulen |
| 6,590,996 | B1 | 7/2003 | Reed | 7,761,712 B2 | 7/2010 | Moskowitz |
| 6,598,162 | B1 | 7/2003 | Moskowitz | 7,779,261 B2 | 8/2010 | Moskowitz |
| 6,606,393 | B1 | 8/2003 | Xie et al. | 2001/0010078 A1 | 7/2001 | Moskowitz |
| 6,647,424 | B1 | 11/2003 | Pearson et al. | 2001/0029580 A1 | 10/2001 | Moskowitz |
| 6,658,010 | B1 | 12/2003 | Enns et al. | 2001/0043594 A1 | 11/2001 | Ogawa et al. |
| 6,665,489 | B2 | 12/2003 | Collart | 2002/0009208 A1 | 1/2002 | Alattar |
| 6,668,246 | B1 | 12/2003 | Yeung et al. | 2002/0010684 A1 | 1/2002 | Moskowitz |
| 6,668,325 | B1 | 12/2003 | Collberg et al. | 2002/0026343 A1 | 2/2002 | Duenke |
| 6,674,858 | B1 | 1/2004 | Kimura | 2002/0056041 A1 | 5/2002 | Moskowitz |
| 6,687,683 | B1 | 2/2004 | Harada et al. | 2002/0047873 A1 | 6/2002 | Petrovic |
| 6,725,372 | B1 | 4/2004 | Lewis et al. | 2002/0071556 A1 | 6/2002 | Moskowitz et al. |
| 6,754,822 | B1 | 6/2004 | Zhao | 2002/0073043 A1 | 6/2002 | Herman et al. |
| 6,775,772 | B1 | 8/2004 | Binding et al. | 2002/0097873 A1 | 7/2002 | Petrovic |
| 6,784,354 | B1 | 8/2004 | Lu et al. | 2002/0103883 A1 | 8/2002 | Haverstock et al. |
| 6,785,815 | B1 | 8/2004 | Serret-Avila et al. | 2002/0161741 A1 | 10/2002 | Wang et al. |
| 6,785,825 | B2 | 8/2004 | Colvin | 2003/0126445 A1 | 7/2003 | Wehrenberg |
| 6,792,548 | B2 | 9/2004 | Colvin | 2003/0133702 A1 | 7/2003 | Collart |
| 6,792,549 | B2 | 9/2004 | Colvin | 2003/0200439 A1 | 10/2003 | Moskowitz |
| 6,795,925 | B2 | 9/2004 | Colvin | 2003/0219143 A1 | 11/2003 | Moskowitz et al. |
| 6,799,277 | B2 | 9/2004 | Colvin | 2004/0028222 A1 | 2/2004 | Sewell et al. |
| 6,813,717 | B2 | 11/2004 | Colvin | 2004/0037449 A1 | 2/2004 | Davis et al. |
| 6,813,718 | B2 | 11/2004 | Colvin | 2004/0049695 A1 | 3/2004 | Choi et al. |
| 6,823,455 | B1 | 11/2004 | Macy et al. | 2004/0059918 A1 | 3/2004 | Xu |
| 6,834,308 | B1 | 12/2004 | Ikezoye et al. | 2004/0083369 A1 | 4/2004 | Erlingsson et al. |
| 6,842,862 | B2 | 1/2005 | Chow et al. | 2004/0086119 A1 | 5/2004 | Moskowitz |
| 6,853,726 | B1 | 2/2005 | Moskowitz et al. | 2004/0093521 A1 | 5/2004 | Hamadeh et al. |
| 6,857,078 | B2 | 2/2005 | Colvin | 2004/0117628 A1 | 6/2004 | Colvin |
| 6,931,534 | B1 | 8/2005 | Jandel et al. | 2004/0117664 A1 | 6/2004 | Colvin |
| 6,957,330 | B1 | 10/2005 | Hughes | 2004/0125983 A1 | 7/2004 | Reed et al. |
| 6,966,002 | B1 | 11/2005 | Torrubia-Saez | 2004/0128514 A1 | 7/2004 | Rhoads |
| 6,977,894 | B1 | 12/2005 | Achilles et al. | 2004/0225894 A1 | 11/2004 | Colvin |
| 6,978,370 | B1 | 12/2005 | Kocher | 2004/0243540 A1 | 12/2004 | Moskowitz et al. |
| 6,986,063 | B2 | 1/2006 | Colvin | 2005/0135615 A1 | 6/2005 | Moskowitz et al. |
| 6,990,453 | B2 | 1/2006 | Wang | 2005/0160271 A9 | 7/2005 | Brundage et al. |
| 7,007,166 | B1 | 2/2006 | Moskowitz et al. | 2005/0177727 A1 | 8/2005 | Moskowitz et al. |
| 7,020,285 | B1 | 3/2006 | Kirovski et al. | 2005/0246554 A1 | 11/2005 | Batson |
| 7,035,049 | B2 | 4/2006 | Yamamoto | 2006/0005029 A1 | 1/2006 | Petrovic et al. |
| 7,035,409 | B1 | 4/2006 | Moskowitz | 2006/0013395 A1 | 1/2006 | Brundage et al. |
| 7,043,050 | B2 | 5/2006 | Yuval | 2006/0013451 A1 | 1/2006 | Haitsma |
| 7,046,808 | B1 | 5/2006 | Metois et al. | 2006/0041753 A1 | 2/2006 | Haitsma |
| 7,050,396 | B1 | 5/2006 | Cohen et al. | 2006/0101269 A1 | 5/2006 | Moskowitz et al. |
| 7,051,208 | B2 | 5/2006 | Venkatesan et al. | 2006/0140403 A1 | 6/2006 | Moskowitz |
| 7,058,570 | B1 | 6/2006 | Yu et al. | 2006/0251291 A1 | 11/2006 | Rhoads |
| 7,093,295 | B1 | 8/2006 | Saito | 2006/0285722 A1 | 12/2006 | Moskowitz et al. |
| 7,095,874 | B2 | 8/2006 | Moskowitz et al. | 2007/0011458 A1 | 1/2007 | Moskowitz |
| 7,103,184 | B2 | 9/2006 | Jian | 2007/0028113 A1 | 2/2007 | Moskowitz |
| 7,107,451 | B2 | 9/2006 | Moskowitz | 2007/0064940 A1 | 3/2007 | Moskowitz et al. |
| 7,123,718 | B1 | 10/2006 | Moskowitz et al. | 2007/0079131 A1 | 4/2007 | Moskowitz et al. |
| 7,127,615 | B2 | 10/2006 | Moskowitz | 2007/0083467 A1 | 4/2007 | Lindahl et al. |
| 6,983,337 | B2 | 11/2006 | Wold | 2007/0110240 A1 | 5/2007 | Moskowitz et al. |
| 7,150,003 | B2 | 12/2006 | Naumovich et al. | 2007/0113094 A1 | 5/2007 | Moskowitz et al. |
| 7,152,162 | B2 | 12/2006 | Moskowitz et al. | 2007/0127717 A1 | 6/2007 | Herre et al. |
| 7,159,116 | B2 | 1/2007 | Moskowitz | 2007/0226506 A1 | 9/2007 | Moskowitz |
| 7,162,642 | B2 | 1/2007 | Schumann et al. | 2007/0253594 A1 | 11/2007 | Lu et al. |
| 7,177,429 | B2 | 2/2007 | Moskowitz et al. | 2007/0294536 A1 | 12/2007 | Moskowitz et al. |
| 7,177,430 | B2 | 2/2007 | Kim | 2007/0300072 A1 | 12/2007 | Moskowitz |
| 7,206,649 | B2 | 4/2007 | Kirovski et al. | 2007/0300073 A1 | 12/2007 | Moskowitz |
| 7,231,524 | B2 | 6/2007 | Burns | 2008/0005571 A1 | 1/2008 | Moskowitz |
| 7,233,669 | B2 | 6/2007 | Candelore | 2008/0005572 A1 | 1/2008 | Moskowitz |
| 7,240,210 | B2 | 7/2007 | Michak et al. | 2008/0016365 A1 | 1/2008 | Moskowitz |
| 7,266,697 | B2 | 9/2007 | Kirovski et al. | 2008/0022113 A1 | 1/2008 | Moskowitz |
| 7,286,451 | B2 | 10/2007 | Wirtz | 2008/0022114 A1 | 1/2008 | Moskowitz |
| 7,287,275 | B2 | 10/2007 | Moskowitz | 2008/0028222 A1 | 1/2008 | Moskowitz |
| 7,289,643 | B2 | 10/2007 | Brunk et al. | 2008/0046742 A1 | 2/2008 | Moskowitz |
| 7,343,492 | B2 | 3/2008 | Moskowitz et al. | 2008/0075277 A1 | 3/2008 | Moskowitz et al. |

| | | | |
|---|---|---|---|
| 2008/0109417 | A1 | 5/2008 | Moskowitz |
| 2008/0133927 | A1 | 6/2008 | Moskowitz et al. |
| 2008/0151934 | A1 | 6/2008 | Moskowitz et al. |
| 2009/0037740 | A1 | 2/2009 | Moskowitz |
| 2009/0089427 | A1 | 4/2009 | Moskowitz et al. |
| 2009/0190754 | A1 | 7/2009 | Moskowitz et al. |
| 2009/0210711 | A1 | 8/2009 | Moskowitz |
| 2009/0220074 | A1 | 9/2009 | Moskowitz et al. |
| 2010/0002904 | A1 | 1/2010 | Moskowitz |
| 2010/0005308 | A1 | 1/2010 | Moskowit |
| 2010/0064140 | A1 | 3/2010 | Moskowitz |
| 2010/0077219 | A1 | 3/2010 | Moskowitz |
| 2010/0077220 | A1 | 3/2010 | Moskowitz |
| 2010/0098251 | A1 | 4/2010 | Moskowitz |
| 2010/0106736 | A1 | 4/2010 | Moskowitz |
| 2010/0153734 | A1 | 6/2010 | Moskowitz |
| 2010/0182570 | A1 | 7/2010 | Chota |
| 2010/0202607 | A1 | 8/2010 | Moskowitz |
| 2010/0220861 | A1 | 9/2010 | Moskowitz |

FOREIGN PATENT DOCUMENTS

| | | | |
|---|---|---|---|
| EP | 0372601 | A1 | 6/1990 |
| EP | 0565947 | | 10/1993 |
| EP | 0565947 | A1 | 10/1993 |
| EP | 0581317 | | 2/1994 |
| EP | 0581317 | A2 | 2/1994 |
| EP | 0649261 | | 4/1995 |
| EP | 0651554 | | 5/1995 |
| EP | 0651554 | A | 5/1995 |
| EP | 0872073 | | 7/1996 |
| EP | 1547337 | | 3/2006 |
| EP | 1354276 | | 12/2007 |
| EP | 1354276 | B1 | 12/2007 |
| NL | 100523 | | 9/1998 |
| NL | 1005523 | | 9/1998 |
| WO | WO 95/14289 | | 5/1995 |
| WO | WO 9514289 | | 5/1995 |
| WO | WO9701892 | | 6/1995 |
| WO | WO 96/29795 | | 9/1996 |
| WO | WO 9629795 | | 9/1996 |
| WO | WO 9642151 | | 12/1996 |
| WO | WO9726733 | | 1/1997 |
| WO | WO 97/24833 | | 7/1997 |
| WO | WO 9724833 | | 7/1997 |
| WO | WO9726732 | | 7/1997 |
| WO | WO 9744736 | | 11/1997 |
| WO | WO9802864 | | 1/1998 |
| WO | WO98/37513 | | 8/1998 |
| WO | WO9837513 | | 8/1998 |
| WO | WO 9952271 | | 10/1999 |
| WO | WO 99/62044 | | 12/1999 |
| WO | WO 9962044 | | 12/1999 |
| WO | WO 9963443 | | 12/1999 |
| WO | WO 0057643 | | 9/2000 |
| WO | WO0118628 | | 3/2001 |
| WO | WO0143026 | | 6/2001 |
| WO | WO0203385 | | 1/2002 |
| WO | WO023385 | A1 | 10/2002 |

OTHER PUBLICATIONS

PCT International Search Report, completed Apr. 4, 1997; authorized officer Bernarr Earl Gregory (PCT/US97/00651) (1 page).
PCT International Search Report, completed May 6, 1997; authorized officer Salvatore Cangialosi (PCT/US97/00652) (3 pages).
PCT International Search Report, completed Oct. 23, 1997; authorized officer David Cain (PCT/US97/11455) (1 page).
PCT International Search Report, completed Jul. 12, 1999; authorized officer R. Hubeau (PCT/US99/07262) (3 pages).
PCT International Search Report, completed Jun. 30, 2000; authorized officer Paul E. Callahan (PCT/US00/06522) (7 pages).
Supplementary European Search Report, completed Jun. 27, 2002; authorized officer M. Schoeyer (EP 00 91 9398) (1 page).
PCT International Search Report, date of mailing Mar. 15, 2001; authorized officer Marja Brouwers (PCT/US00/18411) (5 pages).
PCT International Search Report, completed Jul. 20, 2001; authorized officer A. Sigolo (PCT/US00/18411) (5 pages).
PCT International Search Report, completed Mar. 20, 2001; authorized officer P. Corcoran (PCT/US00/33126) (6 pages).
PCT International Search Report, completed Jan. 26, 2001; authorized officer Gilberto Barron (PCT/US00/21189) (3 pages).
Schneier, Bruce, Applied Cryptography, 2nd Ed., John Wiley & Sons, pp. 9-10, 1996.
Menezes, Alfred J., Handbook of Applied Crypography, CRC Press, p. 46, 1997.
Merriam-Webster's Collegiate Dictionary, 10th Ed., Merriam Webster, Inc., p. 207.
Brealy, et al., Principles of Corporate Finance, "Appendix A-Using Option Valuation Models", 1984, pp. 448-449.
Copeland, et al., Real Options:A Practioner's Guide, 2001 pp. 106-107, 201-202, 204-208.
Sarkar, M. "An Assessment of Pricing Mechanisms for the Internet-A Regulatory Imperative", presented MIT Workshop on Internet Economics, Mar. 1995 http://www.press.ymich.edu/iep/works/SarkAsses.html on.
Crawford, D.W. "Pricing Network Usage:A Market for Bandwith of Market communication?" presented MIT Workshop on Internet Economics, Mar. 1995 http://www.press.ymich.edu/iep/works/CrawMarket.html on March.
Low, S.H., "Equilibrium Allocation and Pricing of Variable Resources Among User-Suppliers", 1988. http://www.citesear.nj.nec.com/366503.html.
Caronni, Germano, "Assuring Ownership Rights for Digital Images", published proceeds of reliable IT systems, v15 '95, H.H. Bruggemann and W. Gerhardt-Hackel (Ed.), Viewing Publishing Company, Germany, 1995.
Zhao, Jian. "A WWW Service to Embed and Prove Digital Copyright Watermarks", Proc. of the european conf. on Mulitmedia Applications, Services & Techniques Louvain-La-Nevve, Belgium, May 1996.
Gruhl,Daniel et al.,Echo Hiding. In Proceeding of the Workshop on Information Hiding. No. 1174 in Lecture Notes in Computer Science,Cambridge, England (May/Jun. 1996).
Oomen,A.W.J. et al., A Variable Bit Rate Buried Data Channel for Compact Disc, J.Audio Eng.Sc.,vol.43,No. 1/2,pp. 23-28 (1995).
Ten Kate,W. et al., A New Surround-Stereo-Surround Coding Techniques, J. Audio Eng.Soc.,vol. 40,No. 5,pp. 376-383 (1992).
Gerzon, Michael et al., A High Rate Buried Data Channel for Audio CD, presentation notes, Audio Engineering Soc. 94th Convention (1993).
Sklar,Bernard, Digital Communications, pp. 601-603 (1988).
Jayant, N.S. et al., Digital Coding of Waveforms, Prentice Hall Inc., Englewood Cliffs,NJ, pp. 486-509 (1984).
Bender, Walter R. et al., Techniques for Data Hiding, SPIE Int. Soc. Opt. Eng., vol. 2420, pp. 164-173, 1995.
Zhao, Jian et al., Embedding Robust Labels into Images for Copyright Protection, (xp 000571976), pp. 242-251, 1995.
Menezes, Alfred J., Handbook of Applied Cryptography, CRC Press, p. 175, 1997.
Schneier, Bruce, Applied Cryptography, 1st Ed., pp. 67-68, 1994.
Ten Kate, W. et al., "Digital Audio Carrying Extra Information", IEEE, CH 2847-2/90/0000-1097, (1990).
Van Schyndel, et al. A digital Watermark, IEEE Int'l Computer Processing Conference, Austin,TX, Nov. 13-16, 1994, pp. 86-90.
Smith, et al. Modulation and Information Hiding in Images, Springer Verlag, 1st Int'l Workshop, Cambridge, UK, May 30-Jun. 1,1996, pp. 207-227.
Kutter, Martin et al., Digital Signature of Color Images Using Amplitude Modulation, SPIE-E197, vol. 3022, pp. 518-527.
Puate, Joan et al., Using Fractal Compression Scheme to Embed a Digital Signature into an Image, SPIE-96 Proceedings, vol. 2915, Mar. 1997, pp. 108-118.
Swanson, Mitchell D.,et al. Transparent Robust Image Watermarking, Proc. of the 1996 IEEE Int'l Conf. on Image Processing, vol. 111, 1996 , pp. 211-214.
Swanson, Mitchell D., et al. Robust Data Hiding for Images, 7th IEEE Digital Signal Processing Workshop, Leon, Norway. Sep. 1-4,1996, pp. 37-40.
Zhao, Jian et al., Embedding Robust Labels into Images for Copyright Protection, Proceeding of the Know Right '95 Conference, pp. 242-251.

Koch, E., et al., Towards Robust and Hidden Image Copyright Labeling, 1995 IEEE Workshop on Nonlinear Signal and Image Processing, Jun. 1995, Neos Marmaras, pp. 4.
Van Schyandel, et al. Towards a Robust Digital Watermark, Second Asain Image Processing Conference, Dec. 6-8, 1995,Singapore, vol. 2,pp. 504-508.
Tirkel,A.Z., A Two-Dimensional Digital Watermark, DICTA '95, Univ. of Queensland, Brisbane, Dec. 5-8, 1995, pp. 7.
Tirkel,A.Z., Image Watermarking-A Spread Spectrum Application, ISSSTA '96, Sep. 1996, Mainz, German, pp. 6.
O'Ruanaidh, et al. Watermarking Digital Images for Copyright Protection, IEEE Proceedings, vol. 143, No. 4, Aug. 96, pp. 250-256.
Cox, et al., Secure Spread Spectrum Watermarking for Multimedia, NEC Research Institute, Techinal Report 95-10, pp. 33.
Kahn, D., The Code Breakers, The MacMillan Company, 1969, pp. xIII, 81-83,513,515,522-526,863.
Boney, et al., Digital Watermarks for Audio Signals, EVSIPCO, 96, pp. 473-480.
Dept. of Electrical Engineering, Del Ft University of Technology, Del ft The Netherlands,Cr.C. Langelaar et al.,Copy Protection for Mulitmedia Data based on Labeling Techniques, Jul. 1996, 9 pp.
F. Hartung, et al., Digital Watermarking of Raw and Compressed Video, SPIE vol. 2952, pp. 205-213.
Craver, et al., Can Invisible Watermarks Resolve Rightful Ownerships? IBM Research Report, RC 20509 (Jul. 25,1996) 21 pp.
Press, et al., Numerical Recipes in C, Cambridge Univ. Press, 1988, pp. 398-417.
Pohlmann, Ken C., Principles of Digital Audio, 3rd Ed., 1995, pp. 32-37, 40-48,138,147-149,332,333,364, 499-501,508-509,564-571.
Pohlmann, Ken C., Principles of Digital Audio, 2nd Ed., 1991, pp. 1-9,19-25,30-33,41-48,54-57,86-107,375-387.
Schneier, Bruce, Applied Cryptography, John Wiley & Sons, inc. , New York,1994, pp. 68,69,387-392,1-57,273-275,321-324.
Boney, et al., Digital Watermarks for Audio Signals, Proceedings of the International Conf. on Multimedia Computing and Systems, Jun. 17-23,1996.Hiroshima, Japan, 0-8186-7436-9196, pp. 473-480.
Johnson, et al., Transform Permuted Watermarking for Copyright Protection of Digital Video, IEEE Globecom 1998, Nov. 8-12,1998, New York, New York, vol. 2, 1998 pp. 684-689 (ISBN 0-7803-4985-7).
Rivest, et al., "Pay Word and Micromint: Two Simple Micropayment Schemes, "MIT Laboratory for Computer Science, Cambridge, MA, May 7, 1996 pp. 1-18.
Bender, et al., Techniques for Data Hiding, IBM Systems Journal, vol. 35, Nos. 3 & 4,1996,pp. 313-336.
Moskowitz, Bandwith as Currency, IEEE Multimedia, Jan.-Mar. 2003, pp. 14-21.
Moskowitz, Multimedia Security Technologies for Digital Rights Management, 2006, Academic Press, "Introduction-Digital Rights Management" pp. 3-22.
Tomsich, et al., "Towards a secure and de-centralized digital watermarking infrastructure for the protection of Intellectual Property", in Electronic Commerce and Web Technologies, Proceedings (ECWEB.
Moskowitz, "What is Acceptable Quality in the Application of Digital Watermarking: Trade-offs of Security, Robustness and Quality", IEEE Computer Society Proceedings of ITCC 2002, Apr. 10, 2002, pp. 80-84.
Lemma, et al. "Secure Watermark Embedding through Partial Encryption", International Workshop on Digital Watermarking ("IWDW" 20061), Springer Lecture Notes in Computer Science, 2006. (to appear) 13.
Kocher, et al., "Self Protecting Digital Content", Technical Report from the CRI Content Security Research Initiative, Crytography Research, Inc. 2002-2003, 14 pages.
Sirbu, M. et al., "Net Bill: An Internet Commerce System Optimized for Network Delivered Services", Digest of Papers of the Computer Society Computer Conference (Spring), Mar. 5, 1995, pp. 20-25 vol. CONF40.
Schunter, M. et al., "A Status Report on the SEMPER framework for Secure Electronic Commerce", Computer Networks and ISDN Systems, Sep. 30, 1998, pp. 1501-1510, vol. 30, No. 16-18, NL, North Holland.
Konrad, K. et al., "Trust and Elecronic Commerce-more than a techinal problem," Proceedings of the 18th IEEE Symposium on Reliable Distributed Systems, Oct. 19-22, 1999, pp. 360-365, Lausanne.
Kini, a. et al., "Trust in Electronic Commerce: Definition and Theoretical Considerations", Proceedings of the 31st Hawaii Int'l Conf on System Sciences (Cat. No. 98TB100216), Jan. 6-9, 1998, pp. 51-61 Los.
Steinauer D. D., et al., "Trust and Traceability in Electronic Commerce", Standard View, Sep. 1997, pp. 118-124, vol. 5 No. 3, ACM, USA.
Hartung, et al. "Multimedia Watermarking Techniques", Proceedings of the IEEE, Special Issue, Identification & Protection of Multimedia Information, pp. 1079-1107 Jul. 1949 vol. 7, IEEE.
Rivest,et al., PayWord and MicroMint: Two simple micropayment schemes, MIT Laboratory for Computer Science, Cambridge, MA 02139, Apr. 27, 2001, pp. 1-18.
Horowitz, et al., The Art of Electronics, 2nd Ed., 1989, pp. 7.
Delaigle, J.-F., et al. "Digital Watermarking," Proceedings of the SPIE, vol. 2659, Feb. 1, 1996, pp. 99-110 (Abstract).
Schneider, M., et al. "Robust Content Based Digital Signature for Image Authentication," Proceedings of the International Conference on Image Processing (IC, Lausanne), Sep. 16-19, 1996, pp. 227-230, IEEE ISBN:.
Cox, I. J., et al. "Secure Spread Spectrum Watermarking for Multimedia," IEEE Transactions on Image Processing, vol. 6 No. 12, Dec. 1, 1997, pp. 1673-1686.
Wong, Ping Wah. "A Public Key Watermark for Image Verification and Authentication," IEEE International Conference on Image Processing, vol. 1, Oct. 4-7, 1998, pp. 455-459.
Fabien A.P. Petitcolas, Ross J. Anderson and Markkus G. Kuhn, "Attacks on Copyright Marking Systems," LNCS, vol. 1525, Apr. 14-17, 1998, pp. 218-238, ISBN: 3-540-65386-4.
Ross Anderson, "Stretching the Limits of Steganography," LNCS, vol. 1174, May/Jun. 1996, 10 pages, ISBN: 3-540-61996-8.
Joseph J.K. O'Ruanaidh and Thierry Pun, "Rotation, Scale and Translation Invariant Digital Image Watermarking", pre-publication, Summer 1997, 4 pages.
Joseph J.K. O'Ruanaidh and Thierry Pun, "Rotation, Scale and Translation Invariant Digital Image Watermarking", Submitted to Signal Processing, Aug. 21, 1997, 19 pages.
Oasis (Dig Out Your Soul), Big Brother Recordings Ltd, Promotional CD image, 2008, 1 page.
Rivest, R. "Chatting and Winnowing: Confidentiality without Encryption", MIT Lab for Computer Scienc, http://people.csail.mit.edu/rivest/Chaffing.txt, Apr. 24, 1998, 9 pp.
PortalPlayer, PP5002 digitalmedia management system-on-chip, May 1, 2003, 4 pp.
VeriDisc, "The Search for a Rational Solution to Digital Rights Management (DRM)", http://64.244.235.240/news/whitepaper,/docs/veridisc_white_paper.pdf, 2001, 15 pp.
Cayre, et al., "Kerckhoff's-Based Embedding Security Classes for WOA Data Hiding", IEEE Transactions on Information Forensics and Security, vol. 3 No. 1, Mar. 2008, 15 pp.
Wayback Machine, dated Jan. 17, 1999, http://web.archive.org/web/19990117020420/http://www.netzero.com/, accessed on Feb. 19, 2008.
Namgoong, H., "An Integrated Approach to Legacy Data for Multimedia Applications", Proceedings of the 23rd EUROMICRO Conference, vol., Issue 1-4, Sep. 1997, pp. 387-391.
Wayback Machine, dated Aug. 26, 2007, http://web.archive.org/web/20070826151732/http://www.screenplaysmag.com/tabid/96/articleType/ArticleView/articleld/495/Defalt.aspx/.
"YouTube Copyright Policy: Video Identification Tool—YouTube Help", accessed Jun. 4, 2009, http://www.google.com/support/youtube/bin/answer.py?h1=en&answer=83766, 3 pp.
Morimoto, "Techniques for Data Hiding in Audio Files", no publication date provided, Massachussetts, United States.
U.S. Appl. No. 08/999,766, filed Jul. 23, 1997, entitled "Steganographic Method and Device", published as 7568100 Jul. 28, 2009.
EPO Application No. 96919405.9, entitled "Steganographic Method and Device"; published as EP0872073 (A2), Oct. 21, 1998.

U.S. Appl. No. 11/050,779, filed Feb. 7, 2005, entitled "Steganographic Method and Device", published as 20050177727 A1 Aug. 11, 2005.

U.S. Appl. No. 08/674,726, filed Jul. 2, 1996, entitled "Exchange Mechanisms for Digital Information Packages with Bandwidth Securitization, Multichannel Digital Watermarks, and Key Management", published as 7362775 Apr. 22, 2008.

U.S. Appl. No. 09/545,589, filed Apr. 7, 2000, entitled "Method and System for Digital Watermarking", published as 7007166 Feb. 28, 2006.

U.S. Appl. No. 11/244,213, filed Oct. 5, 2005, entitled "Method and System for Digital Watermarking", published as 2006-0101269 A1 May 11, 2006.

U.S. Appl. No. 11/649,026, filed Jan. 3, 2007, entitled "Method and System for Digital Watermarking", published as 2007-0113094 A1 May 17, 2007.

U.S. Appl. No. 09/046,627, filed Mar. 24, 1998, entitled "Method for Combining Transfer Function with Predetermined Key Creation", published as 6,598,162 Jul. 22, 2003.

U.S. Appl. No. 10/602,777, filed Jun. 25, 2003, entitled "Method for Combining Transfer Function with Predetermined Key Creation", published as 2004-0086119 A1 May 6, 2004.

U.S. Appl. No. 09/053,628, filed Apr. 2, 1998, entitled "Multiple Transform Utilization and Application for Secure Digital Watermarking", 6,205,249 Mar. 20, 2001.

U.S. Appl. No. 09/644,098, filed Aug. 23, 2000, entitled "Multiple Transform Utilization and Application for Secure Digital Watermarking", published as 7,035,409 Apr. 25, 2006.

Jap. App. No. 2000-542907, entitled "Multiple Transform Utilization and Application for Secure Digital Watermarking"; which is a JP national stage of PCT/US1999/007262, published as WO/1999/052271, Oct. 14, 1999.

U.S. Appl. No. 09/767,733, filed Jan. 24, 2001 entitled "Multiple Transform Utilization and Application for Secure Digital Watermarking", published as 2001-0010078 A1 Jul. 26, 2001.

U.S. Appl. No. 11/358,874, filed Feb. 21, 2006, entitled "Multiple Transform Utilization and Application for Secure Digital Watermarking", published as 2006-0140403 A1 Jun. 29, 2006.

U.S. Appl. No. 10/417,231, filed Apr. 17, 2003, entitled "Methods, Systems and Devices for Packet Watermarking and Efficient Provisioning of Bandwidth", published as 2003-0200439 A1 Oct. 23, 2003.

U.S. Appl. No. 09/789,711, filed Feb. 22, 2001, entitled "Optimization Methods for the Insertion, Protection, and Detection of Digital Watermarks in Digital Data", published as 2001-0029580 A1 Oct. 11, 2001.

U.S. Appl. No. 11/497,822, filed Aug. 2, 2006, entitled "Optimization Methods for the Insertion, Protection, and Detection of Digital Watermarks in Digital Data", published as 2007-0011458 A1 Jan. 11, 2007.

U.S. Appl. No. 11/599,964, filed Nov. 15, 2006, entitled "Optimization Methods for the Insertion, Protection, and Detection of Digital Watermarks in Digital Data", published as 2008-0046742 A1 Feb. 21, 2008.

U.S. Appl. No. 11/599,838, filed Nov. 15, 2006, entitled "Optimization Methods for the Insertion, Protection, and Detection of Digital Watermarks in Digital Data", published as 2007-0226506 A1 Sep. 27, 2007.

U.S. Appl. No. 10/369,344, filed Feb. 18, 2003, entitled "Optimization Methods for the Insertion, Protection, and Detection of Digital Watermarks in Digitized Data", published as 2003-0219143 A1 Nov. 27, 2003.

U.S. Appl. No. 11/482,654, filed Jul. 7, 2006, entitled "Optimization Methods for the Insertion, Protection, and Detection of Digital Watermarks in Digitized Data", published as 2006-0285722 A1 Dec. 21, 2006.

U.S. Appl. No. 09/594,719, filed Jun. 16, 2000, entitled "Utilizing Data Reduction in Steganographic and Cryptographic Systems", published as 7,123,718 Oct. 17, 2006.

U.S. Appl. No. 11/519,467, filed Sep. 12, 2006, entitled "Utilizing Data Reduction in Steganographic and Cryptographic Systems", published as 2007-0064940 A1 Mar. 22, 2007.

U.S. Appl. No. 09/731,040, filed Dec. 7, 2000, entitled "Systems, Methods and Devices for Trusted Transactions", 2002-0010684 A1 Jan. 24, 2002.

U.S. Appl. No. 11/512,701, filed Aug. 29, 2006, entitled "Systems, Methods and Devices for Trusted Transactions", published as 2007-0028113 A1 Feb. 1, 2007.

U.S. Appl. No. 10/049,101, filed Feb. 8, 2002, entitled "A Secure Personal Content Server", published as 7,475,246 Jan. 6, 2009.

PCT Application No. PCT/US00/21189, filed Aug. 4, 2000, entitled, "A Secure Personal Content Server", Pub. No. WO/2001/018628 ; Publication Date: Mar. 15, 2001.

U.S. Appl. No. 09/657,181, filed Sep. 7, 2000, entitled "Method and Device for Monitoring and Analyzing Signals", published as 7,346,472 Mar. 18, 2008.

U.S. Appl. No. 10/805,484, filed Mar. 22, 2004, entitled "Method and Device for Monitoring and Analyzing Signals", published as 2004-0243540 A1 Dec. 2, 2004.

U.S. Appl. No. 09/956,262, filed Sep. 20, 2001, entitled "Improved Security Based on Subliminal and Supraliminal Channels for Data Objects", published as 2002-0056041 A1 May 9, 2002.

U.S. Appl. No. 11/518,806, filed Sep. 11, 2006, entitled "Improved Security Based on Subliminal and Supraliminal Channels for Data Objects", 2008-0028222 A1 Jan. 31, 2008.

U.S. Appl. No. 11/026,234, filed Dec. 30, 2004, entitled "Z-Transform Implementation of Digital Watermarks" , published as 2005-0135615 A1 Jun. 23, 2005.

U.S. Appl. No. 11/592,079, filed Nov. 2, 2006, entitled "Linear Predictive Coding Implementation of Digital Watermarks", published as 2007-0079131 A1 Apr. 5, 2007.

U.S. Appl. No. 09/731,039, filed Dec. 7, 2000, entitled "System and Methods for Permitting Open Access to Data Objects and for Securing Data within the Data Objects", published as 2002-0071556 A1 Jun. 13, 2002.

U.S. Appl. No. 11/647,861, filed Dec. 29, 2006, entitled "System and Methods for Permitting Open Access to Data Objects and for Securing Data within the Data Objects", published as 2007-0110240 A1 May 17, 2007.

Schneier, Bruce, Applied Cryptography, 2nd Ed., John Wiley & Sons, pp. 9-10, 1996.

Menezes, Alfred J., Handbook of Applied Cryptography, CRC Press, p. 46, 1997.

Merriam-Webster's Collegiate Dictionary, 10th Ed., Merriam Webster, Inc., p. 207.

Brealy, et al., Principles of Corporate Finance, "Appendix A—Using Option Valuation Models", 1984, pp. 448-449.

Copeland, et al., Real Options: A Practitioner's Guide, 2001 pp. 106-107, 201-202, 204-208.

Sarkar, M. "An Assessment of Pricing Mechanisms for the Internet-A Regulatory Imperative", presented MIT Workshop on Internet Economics, Mar. 1995 http://www.press.vmich.edu/iep/works/SarkAsses.html on.

Crawford, D.W. "Pricing Network Usage: A Market for Bandwidth of Market Communication?" presented MIT Workshop on Internet Economics, Mar. 1995 http://www.press.vmich.edu/iep/works/CrawMarket.html on March.

Low, S.H., "Equilibrium Allocation and Pricing of Variable Resources Among User-Suppliers", 1988. http://www.citesear.nj.nec.com/366503.html.

Caronni, Germano, "Assuring Ownership Rights for Digital Images", published proceeds of reliable IT systems, v15 '95, H.H. Bruggemann and W. Gerhardt-Hackel (Ed) Viewing Publishing Company Germany 1995.

Zhao, Jian. "A WWW Service to Embed and Prove Digital Copyright Watermarks", Proc. of the European conf. on Multimedia Applications, Services & Techniques Louvain-La-Nevve Belgium May 1996.

Gruhl, Daniel et al., Echo Hiding. In Proceeding of the Workshop on Information Hiding. No. 1174 in Lecture Notes in Computer Science, Cambridge, England (May/Jun. 1996).

Oomen, A.W.J. et al., A Variable Bit Rate Buried Data Channel for Compact Disc, J.AudioEng. Sc., vol. 43, No. 1/2, pp. 23-28 (1995).

Ten Kate, W. et al., A New Surround-Stereo-Surround Coding Techniques, J. Audio Eng.Soc., vol. 40,No. 5,pp. 376-383 (1992).

Gerzon, Michael et al., A High Rate Buried Data Channel for Audio CD, presentation notes, Audio Engineering Soc. 94th Convention (1993).

Sklar, Bernard, Digital Communications, pp. 601-603 (1988).

Jayant, N.S. et al., Digital Coding of Waveforms, Prentice Hall Inc., Englewood Cliffs, NJ, pp. 486-509 (1984).

Bender, Walter R. et al., Techniques for Data Hiding, SPIE Int. Soc. Opt. Eng., vol. 2420, pp. 164-173, 1995.

Zhao, Jian et al., Embedding Robust Labels into Images for Copyright Protection, (xp 000571976), pp. 242-251, 1995.

Menezes, Alfred J., Handbook of Applied Cryptography, CRC Press, p. 175, 1997.

Schneier, Bruce, Applied Cryptography, 1st Ed., pp. 67-68, 1994.

Ten Kate, W. et al., "Digital Audio Carrying Extra Information", IEEE, CH 2847-2/90/0000-1097, (1990).

Van Schyndel, et al., "A digital Watermark," IEEE Int'l Computer Processing Conference, Austin,TX, Nov. 13-16, 1994, pp. 86-90.

Smith, et al. "Modulation and Information Hiding in Images", Springer Verlag, 1st Int'l Workshop, Cambridge, UK, May 30-Jun. 1, 1996, pp. 207-227.

Kutter, Martin et al., "Digital Signature of Color Images Using Amplitude Modulation", SPIE-E197, vol. 3022, pp. 518-527.

Puate, Joan et al., "Using Fractal Compression Scheme to Embed a Digital Signature into an Image", SPIE-96 Proceedings, vol. 2915, Mar. 1997, pp. 108-118.

Swanson, Mitchell D.,et al., "Transparent Robust Image Watermarking", Proc. of the 1996 IEEE Int'l Conf. on Image Processing, vol. 111, 1996, pp. 211-214.

Swanson, Mitchell D., et al. "Robust Data Hiding for Images", 7th IEEE Digital Signal Processing Workshop, Leon, Norway. Sep. 1-4, 1996, pp. 37-40.

Zhao, Jian et al., "Embedding Robust Labels into Images for Copyright Protection", Proceeding of the Know Right '95 Conference, pp. 242-251.

Koch, E., et al., "Towards Robust and Hidden Image Copyright Labeling", 1995 IEEE Workshop on Nonlinear Signal and Image Processing, Jun. 1995 Neos Marmaras pp. 4.

Van Schyandel, et al., "Towards a Robust Digital Watermark", Second Asain Image Processing Conference, Dec. 6-8, 1995, Singapore, vol. 2, pp. 504-508.

Tirkel,A.Z., "A Two-Dimensional Digital Watermark", DICTA '95, Univ. of Queensland, Brisbane, Dec. 5-8, 1995, pp. 7.

Tirkel,A.Z., "Image Watermarking—A Spread Spectrum Application", ISSSTA '96, Sep. 1996, Mainz, German, pp. 6.

O'Ruanaidh, et al. "Watermarking Digital Images for Copyright Protection", IEEE Proceedings, vol. 143, No. 4, Aug. 1996, pp. 250-256.

Cox, et al., Secure Spread Spectrum Watermarking for Multimedia, NEC Research Institute, Techinal Report 95-10, pp. 33.

Kahn, D., "The Code Breakers", The MacMillan Company, 1969, pp. xIII, 81-83, 513, 515, 522-526, 863.

Boney, et al., Digital Watermarks for Audio Signals, EVSIPCO, 96, pp. 473-480 (Mar. 14, 1997).

Dept. of Electrical Engineering, Del Ft University of Technology, Del ft The Netherlands, Cr.C. Langelaar et al.,"Copy Protection for Multimedia Data based on Labeling Techniques", Jul. 1996 9 pp.

F. Hartung, et al., "Digital Watermarking of Raw and Compressed Video", SPIE vol. 2952, pp. 205-213.

Craver, et al., "Can Invisible Watermarks Resolve Rightful Ownerships?", IBM Research Report, RC 20509 (Jul. 25, 1996) 21 pp.

Press, et al., "Numerical Recipes in C", Cambridge Univ. Press, 1988, pp. 398-417.

Pohlmann, Ken C., "Principles of Digital Audio", 3rd Ed., 1995, pp. 32-37, 40-48:138, 147-149, 332, 333, 364, 499-501, 508-509, 564-571.

Pohlmann, Ken C., "Principles of Digital Audio", 2nd Ed., 1991, pp. 1-9, 19-25, 30-33, 41-48, 54-57, 86-107, 375-387.

Schneier, Bruce, Applied Cryptography, John Wiley & Sons, Inc., New York, 1994, pp. 68, 69, 387-392, 1-57, 273-275, 321-324.

Boney, et al., Digital Watermarks for Audio Signals, Proceedings of the International Conf. on Multimedia Computing and Systems, Jun. 17-23, 1996 Hiroshima, Japan, 0-8186-7436-9196, pp. 473-480.

Johnson, et al., "Transform Permuted Watermarking for Copyright Protection of Digital Video", IEEE Globecom 1998, Nov. 8-12, 1998, New York New York vol. 2 1998 pp. 684-689 (ISBN 0-7803-4985-7).

Rivest, et al., "PayWord and Micromint: Two Simple Micropayment Schemes," MIT Laboratory for Computer Science, Cambridge, MA, May 7, 1996 pp. 1-18.

Bender, et al., "Techniques for Data Hiding", IBM Systems Journal, (1996) vol. 35, Nos. 3 & 4,1996, pp. 313-336.

Moskowitz, "Bandwith as Currency", IEEE Multimedia, Jan.-Mar. 2003, pp. 14-21.

Moskowitz, Multimedia Security Technologies for Digital Rights Management, 2006, Academic Press, "Introduction—Digital Rights Management" pp. 3-22.

Rivest, et al., "PayWord and Micromint: Two Simple Micropayment Schemes," MIT Laboratory for Computer Science, Cambridge, MA, Apr. 27, 2001, pp. 1-18.

Tomsich, et al., "Towards a secure and de-centralized digital watermarking infrastructure for the protection of Intellectual Property", in Electronic Commerce and Web Technologies, Proceedings (ECWEB)(2000).

Moskowitz, "What is Acceptable Quality in the Application of Digital Watermarking: Trade-offs of Security; Robustness and Quality", IEEE Computer Society Proceedings of ITCC 2002 Apr. 10, 2002 pp. 80-84.

Lemma, et al. "Secure Watermark Embedding through Partial Encryption", International Workshop on Digital Watermarking ("IWDW" 2006). Springer Lecture Notes in Computer Science 2006 (to appear) 13.

Kocher, et al., "Self Protecting Digital Content", Technical Report from the CRI Content Security Research Initiative, Cryptography Research, Inc. 2002-2003 14 pp.

Sirbu, M. et al., "Net Bill: An Internet Commerce System Optimized for Network Delivered Services", Digest of Papers of the Computer Society Computer Conference (Spring) Mar. 5, 1995 pp. 20-25 vol. CONF40.

Schunter, M. et al., "A Status Report on the SEMPER framework for Secure Electronic Commerce", Computer Networks and ISDN Systems, Sep. 30, 1998, pp. 1501-1510 vol. 30 No. 16-18 NL North Holland.

Konrad, K. et al., "Trust and Electronic Commerce—more than a technical problem," Proceedings of the 18th IEEE Symposium on Reliable Distributed Systems Oct. 19-22, 1999, pp. 360-365 Lausanne.

Kini, et al., "Trust in Electronic Commerce: Definition and Theoretical Considerations", Proceedings of the 31st Hawaii Int'l Conf on System Sciences (Cat. No. 98TB100216). Jan. 6-9, 1998. pp. 51-61. Los.

Steinauer D. D., et al., "Trust and Traceability in Electronic Commerce", Standard View, Sep. 1997, pp. 118-124, vol. 5 No. 3, ACM, USA.

Hartung, et al. "Multimedia Watermarking Techniques", Proceedings of the IEEE, Special Issue, Identification & Protection of Multimedia Information, pp. 1079-1107 Jul. 1999 vol. 87 No. 7 IEEE.

European Search Report & European Search Opinion in EP07112420.

Staind (The Singles 1996-2006), Warner Music—Atlantic, Pre-Release CD image, 2006, 1 page.

Radiohead ("Hail to the Thief"), EMI Music Group—Capitol, Pre-Release CD image, 2003, 1 page.

U.S. Appl. No. 60/169,274, filed Dec. 7, 1999, entitled "Systems, Methods and Devices for Trusted Transactions".

U.S. Appl. No. 60/234,199, filed Sep. 20, 2000, "Improved Security Based on Subliminal and Supraliminal Channels for Data Objects".

U.S. Appl. No. 09/671,739, filed Sep. 29, 2000, entitled "Method and Device for Monitoring and Analyzing Signals".

Duplicate of L-34, Deleted by RN Upon Review on Nov. 16, 2010. Ran.

Duplicate of L-24, Deleted by RN Upon Review on Nov. 16, 2010. Ran.

Duplicate of L-57, Deleted by RN Upon Review on Nov. 16, 2010. Ran.

Duplicate of L-58, Deleted by RN Upon Review on Nov. 16, 2010. Ran.

Duplicate of L-59, Deleted by RN Upon Review on Nov. 16, 2010. Ran.
Duplicate of L-61, Deleted by RN Upon Review on Nov. 16, 2010. Ran.
Duplicate of L-62, Deleted by RN Upon Review on Nov. 16, 2010. Ran.
Duplicate of L-63, Deleted by RN Upon Review on Nov. 16, 2010. Ran.
Duplicate of L-65, Deleted by RN Upon Review on Nov. 16, 2010. Ran.
Tirkel, A.Z., "A Two-Dimensional Digital Watermark", Scientific Technology, 686, 14, date unknown.
Duplicate of L-65, Deleted by RN Upon Review on Nov. 16, 2010. Ran.
Duplicate of L-68, Deleted by RN Upon Review on Nov. 16, 2010. Ran.
Duplicate of L-69, Deleted by RN Upon Review on Nov. 16, 2010. Ran.
Duplicate of L-70, Deleted by RN Upon Review on Nov. 16, 2010. Ran.
Duplicate of L-71, Deleted by RN Upon Review on Nov. 16, 2010. Ran.
Duplicate of L-72, Deleted by RN Upon Review on Nov. 16, 2010. Ran.
Duplicate of L-73, Deleted by RN Upon Review on Nov. 16, 2010. Ran.
Duplicate of L-74, Deleted by RN Upon Review on Nov. 16, 2010. Ran.
Duplicate of L-75, Deleted by RN Upon Review on Nov. 16, 2010. Ran.
Duplicate of L-076, Removed. RN. Nov. 16, 2010.
Duplicate of L-77, Removed. RN. Nov. 16, 2010.
Duplicate of L-78, Removed. RN. Nov. 16, 2010.
Duplicate of L-79, Removed. RN. Nov. 16, 2010.
EP0581317A2, Moved to Foreign Patent Pubs as F-028.
Duplicate of L-52, Removed. RN. Nov. 16, 2010.
Duplicate of L-36, Removed. RN. Nov. 16, 2010.
Duplicate of L-38, Removed. RN. Nov. 16, 2010.
Duplicate of L-37, Removed. RN. Nov. 16, 2010.
Duplicate of L-36, Removed. RN. Nov. 16, 2010.
Duplicate of L-37, Removed. RN. Nov. 16, 2010.
Duplicate of L-38, Removed. RN. Nov. 16, 2010.
L- 0137 Duplicate of L-39, Removed. Rn. Nov. 16, 2010.
L- 0138 Duplicate of L-40, Removed. Rn. Nov. 16, 2010.
L- 0139 Duplicate of L-41, Removed. Rn. Nov. 16, 2010.
L- 0140 Duplicate of L-42, Removed. Rn. Nov. 16, 2010.
L- 0141 Duplicate of L-43, Removed. Rn. Nov. 16, 2010.
L- 0142 Duplicate of L-44, Removed. Rn. Nov. 16, 2010.
L- 0143 Duplicate of L-45, Removed. Rn. Nov. 16, 2010.
L- 0144 Duplicate of L-46, Removed. Rn. Nov. 16, 2010.
L- 0145 Duplicate of L-47, Removed. Rn. Nov. 16, 2010.
L- 0146 Duplicate of L-48, Removed. Rn. Nov. 16, 2010.
L- 0147 Duplicate of L-49, Removed. Rn. Nov. 16, 2010.
L- 0148 Duplicate of L-50, Removed. Rn. Nov. 16, 2010.
L- 0149 Duplicate of L-51, Removed. Rn. Nov. 16, 2010.
L- 0150 Duplicate of L-52, Removed. Rn. Nov. 16, 2010.
L- 0151 Duplicate of L-63, Removed. Rn. Nov. 16, 2010.
L- 0152 Duplicate of L-54, Removed. Rn. Nov. 16, 2010.
L- 0153 Duplicate of L-55, Removed. Rn. Nov. 16, 2010.
L- 0154 Duplicate of L-80, Removed. Rn. Nov. 16, 2010.
PCT International Search Report in PCT/US95/08159.
PCT International Search Report in PCT/US96/10257.
Supplementary European Search Report in EP 96919405.
PCT International Search Report in PCT/US97/00651.
PCT International Search Report in PCT/US97/00652.
PCT International Search Report in PCT/US97/11455.
PCT International Search Report in PCT/US99/07262.
PCT International Search Report in PCT/US00/06522.
Supplementary European Search Report in EP00919398.
PCT International Search Report in PCT/US00/18411.
PCT International Search Report in PCT/US00/18411.
PCT International Search Report in PCT/US00/33126.
PCT International Search Report in PCT/US00/21189.

Delaigle, J.-F., et al. "Digital Watermarking," Proceedings of the SPIE, vol. 2659, Feb. 1, 1996, pp. 99-110.
Schneider, M., et al. "A Robust Content Based Digital Signature for Image Authentication," Proceedings of the International Conference on Image Processing (IC. Lausanne) Sep. 16-19, 1996, pp. 227-230, IEEE ISBN.
Cox, I. J., et al. "Secure Spread Spectrum Watermarking for Multimedia," IEEE Transactions on Image Processing, vol. 6 No. 12, Dec. 1, 1997, pp. 1673-1686.
Wong, Ping Wah. "A Public Key Watermark for Image Verification and Authentication," IEEE International Conference on Image Processing, vol. 1 Oct. 4-7, 1998, pp. 455-459.
Fabien A.P. Petitcolas, Ross J. Anderson and Markkus G. Kuhn, "Attacks on Copyright Marking Systems," LNCS, vol. 1525, Apr. 14-17, 1998, pp. 218-238 ISBN: 3-540-65386-4.
Ross Anderson, "Stretching the Limits of Steganography," LNCS, vol. 1174, May/Jun. 1996, 10 pages, ISBN: 3-540-61996-8.
Joseph J.K. O'Ruanaidh and Thierry Pun, "Rotation, Scale and Translation Invariant Digital Image Watermarking", pre-publication, Summer 1997 4 pages.
Joseph J.K. O'Ruanaidh and Thierry Pun, "Rotation, Scale and Translation Invariant Digital Image Watermarking", Submitted to Signal Processing Aug. 21, 1997, 19 pages.
OASIS (Dig Out Your Soul), Big Brother Recordings Ltd, Promotional CD image, 2008, 1 page.
Rivest, R. "Chaffing and Winnowing: Confidentiality without Encryption", MIT Lab for Computer Science, http://people.csail.mit.edu/rivest/Chaffmg.txt Apr. 24, 1998, 9 pp.
PortalPlayer, PP502 digital media management system-on-chip, May 1, 2003, 4 pp.
VeriDisc, "The Search for a Rational Solution to Digital Rights Management (DRM)", http://64.244.235.240/news/whitepaper,/docs/veridisc.sub.--white.sub.--paper.pdf, 2001, 15 pp.
Cayre, et al., "Kerckhoff's-Based Embedding Security Classes for WOA Data Hiding", IEEE Transactions on Information Forensics and Security, vol. 3 No. 1, Mar. 2008, 15 pp.
Wayback Machine, dated Jan. 17, 1999, http://web.archive.org/web/19990117020420/http://www.netzero.com/, accessed on Feb. 19, 2008.
Namgoong, H., "An Integrated Approach to Legacy Data for Multimedia Applications", Proceedings of the 23rd EUROMICRO Conference, vol., Issue 1-4, Sep. 1997, pp. 387-391.
Wayback Machine, dated Aug. 26, 2007, http://web.archive,org/web/20070826151732/http://www.screenplaysmag.com/t- abid/96/articleType/ArticleView/articleId/495/Default.aspx/.
"YouTube Copyright Policy: Video Identification tool—YouTube Help", accessed Jun. 4, 2009, http://www.google.com/support/youtube/bin/answer.py?hl=en&answer=83766, 3 pp.
PCT Application No. PCT/US95/08159, filed Jun. 26, 1995, entitled, "Digital Information Commodities Exchange with Virtual Menuing", published as WO/1997/001892; Publication Date: Jan. 16, 1997, F24.
PCT Application No. PCT/US96/10257, filed Jun. 7, 1996 entitled "Steganographic Method and Device"—corresponding to—EPO Application No. 96919405.9, entitled "Steganographic Method and Device", published as WO/1996/042151; Publication Date: Dec. 27, 1996, F19.
PCT Application No. PCT/US97/00651, filed Jan. 16, 1997, entitled, "Method for Stega-Cipher Protection of Computer Code", published as WO/1997/026732; Publication Date: Jul. 24, 1997.
PCT Application No. PCT/US97/00652, filed Jan. 17, 1997, entitled, "Method for an Encrypted Digital Watermark", published as WO/1997/026733; Publication Date: Jul. 24, 1997.
PCT Application No. PCT/US97/11455, filed Jul. 2, 1997, entitled, "Optimization Methods for the Insertion, Protection and Detection of Digital Watermarks in Digitized Data", published as WO/1998/002864; Publication Date: Jan. 22, 1998.
PCT Application No. PCT/US99/07262, filed Apr. 2, 1999, entitled, "Multiple Transform Utilization and Applications for Secure Digital Watermarking", published as WO/1999/052271; Publication Date: Oct. 14, 1999.

PCT Application No. PCT/US00/06522, filed Mar. 14, 2000, entitled, "Utilizing Data Reduction in Steganographic and Cryptographic Systems", published as WO/2000/057643; Publication Date: Sep. 28, 2000.

PCT Application No. PCT/US00/18411, filed Jul. 5, 2000, entitled, "Copy Protection of Digital Data Combining Steganographic and Cryptographic Techniques".

PCT Application No. PCT/US00/33126, filed Dec. 7, 2000, entitled "Systems, Methods and Devices for Trusted Transactions", published as WO/2001/043026; Publication Date: Jun. 14, 2001.

EPO Divisional Patent Application No. 07112420.0, entitled "Steganographic Method and Device" corresponding to PCT Application No. PCT/US96/10257, published as WO/1996/042151, Dec. 27, 1996.

U.S. Appl. No. 60/222,023, filed Jul. 31, 2007 entitled "Method and apparatus for recognizing sound and signals in high noise and distortion".

U.S. Appl. No. 11/458,639, filed Jul. 19, 2006 entitled "Methods and Systems for Inserting Watermarks in Digital Signals", published as 20060251291 A1 Nov. 9, 2006, P82.

"Techniques for Data Hiding in Audio Files," by Morimoto, 1995.

Howe, Dennis Jul. 13, 1998 http://foldoc..org//steganography.

CSG, Computer Support Group and CSGNetwork.com 1973 http://www.csgnetwork.com/glossarys.html.

QuinStreet Inc. 2010 What is steganography?-A word definition from the Webopedia Computer Dictionary http://www.webopedia.com/terms/steganography.html.

Graham, Robert Aug. 21, 2000 "Hacking Lexicon" http://robertgraham.com/pubs/hacking-dict.html.

Farkex, Inc 2010 "Steganography definition of steganography in the Free Online Encyclopedia" http://encyclopedia2.Thefreedictionary.com/steganography.

Horowitz, et al., The Art of Eletronics. $2^{nd}$ Ed., 1989, pp. 7.

Jimmy eat world ("futures"), Interscope Records, Pre-Release CD image, 2004, 1 page.

Aerosmith ("Just Push Play"), Pre-Release CD image, 2001, 1 page.

Phil Collins(Testify) Atlantic, Pre-Release CD image, 2002, 1 page.

\* cited by examiner

STEGANOGRAPHIC METHOD AND DEVICE

CROSS REFERENCE TO RELATED APPLICATIONS

This application is a continuation of U.S. patent application Ser. No. 08/999,766, filed Jul. 23, 1997, now U.S. Pat. No. 7,568,100, which is a division of U.S. patent application Ser. No. 08/775,216, filed Dec. 31, 1996, now U.S. Pat. No. 5,687,236, which is a continuation of U.S. patent application Ser. No. 08/489,172, filed Jun. 7, 1995, now U.S. Pat. No. 5,613,004.

DEFINITIONS

Several terms of art appear frequently in the following. For ease of reference they are defined here as follows:

"Content" refers to multimedia content. The term encompasses the various types of information to be processed in a multimedia entertainment system. Content specifically refers to digitized audio, video or still images in the context of this discussion. This information may be contained within files on a multimedia computer system, the files having a particular format specific to the modality of the content (sound, images, moving pictures) or the type of systems, computer or otherwise, used to process the content.

"Digitized" refers to content composed of discrete digital samples of an otherwise analog media, which approximate that media inside a computer or other digital device. For instance, the sound of music occurs naturally, and is experienced by humans as an analog (continuous) sound wave. The sound can be digitized into a stream of discrete samples, or numbers, each of which represents an approximate value of the amplitude of the real analog wave at a particular instant in time. These samples can be stored in files in a computer and then used to recreate the original sound wave to a high degree of accuracy. In general, content entering a digital system is digitized by Analog to Digital converters (A/D) and analog media are recreated by the digital system using a Digital to Analog (D/A) converter. In the context of this discussion content is always digitized content.

"Cryptography" is a field covering numerous techniques for scrambling information conveying messages so that when the message is conveyed between the sender and receiver an unintended party who intercepts this message cannot read it, or extract useful information from it.

A "Public Key Cryptosystem" is a particular cryptographic system where all parties possess pairs of keys for encryption and decryption. Parties to this type of system freely distribute their public keys, which other may use to encrypt messages to the owner of the public key. Such messages are decrypted by the receiver with the private key. Private keys are never distributed. A message encrypted with a public key can only be decrypted with the corresponding private key, and vice versa. A message encrypted with a private key is said to have been signed by the owner of that key. Anyone in possession of the public key may decrypt the message and known that it was encrypted, and thus signed, by the owner of the public key, since only they possess the corresponding private key.

"Steganography" is a field distinguished from cryptography, but associated with it, that covers numerous methods for hiding an informational message within some other medium, perhaps another unrelated message, in such a manner that an unintended party who intercepts the medium carrying the hidden message does not know it contains this hidden message and therefore does not obtain the information in the hidden message. In other words, steganography seeks to hide messages in plain view.

BACKGROUND OF THE INVENTION

In the current environment of computer networks and the proliferation of digital or digitized multimedia content which may be distributed over such networks, a key issue is copyright protection. Copyright protection is the ability to prevent or deter the proliferation of unauthorized copies of copyrighted works. It provides a reasonable guarantee that the author of a copyrighted work will be paid for each copy of that work.

A fundamental problem in the digital world, as opposed to the world of physical media, is that a unlimited number of perfect copies may be made from any piece of digital or digitized content. A perfect copy means that if the original is comprised of a given stream of numbers, then the copy matches the original, exactly, for each number in the stream. Thus, there is no degradation of the original signal during the copy operation. In an analog copy, random noise is always introduced, degrading the copied signal.

The act of making unlicensed copies of some content, digital or analog, whether audio, video, software or other, is generally known as piracy. Piracy has been committed for the purpose of either profit from the sale of such unlicensed copies, or to procure for the "pirate" a copy of the content for personal use without having paid for it.

The problem of piracy has been made much worse for any type of content by the digitization of content. Once content enters the digital domain, an unlimited number of copies may be made without any degradation, if a pirate finds a way to break whatever protection scheme was established to guard against such abuses, if any. In the analog world, there is generally a degradation in the content (signal) with each successive copy, imposing a sort of natural limit on volume of piracy.

To date, three general types of schemes have been implemented in an attempt to protect copyrights.
1) Encryption
2) Copy Protection
3) Content Extensions Copy Protection and Content Extensions generally apply in the digital world only, while a scheme related to Encryption, commonly known as scrambling, may be applied to an analog signal. This is typical in analog cable systems.

Encryption scrambles the content. Before the content is made ready for delivery, whether on floppy disk, or over a network, it must be encrypted, or scrambled. Once the content has been encrypted, it cannot be used until it is decrypted, or unscrambled. Encrypted audio data might sound like incomprehensible screeching, while an encrypted picture or video might appear as random patterns on a screen. The principle of encryption is that you are free to make as many copies as you want, but you can't read anything that makes sense until you use a special key to decrypt, and you can only obtain the key by paying for the content.

Encryption has two problems, however. 1) Pirates have historically found ways to crack encryption, in effect, obtaining the key without having paid for it; and 2) Once a single legitimate copy of some content has been decrypted, a pirate is now free to make unlimited copies of the decrypted copy. In effect, in order to sell an unlimited quantity of an encrypted piece of software, the pirate could simply buy one copy, which they are entitled to decrypt.

Copy Protection includes various methods by which a software engineer can write the software in a clever manner to determine if it has been copied, and if so to deactivate itself. Also included are undocumented changes to the storage format of the content. Copy protection was generally abandoned by the software industry, since pirates were generally just as clever as the software engineers and figured out ways to modify their software and deactivate the protection. The cost of developing such protection was not justified considering the level of piracy which occurred despite the copy protection.

Content Extension refers to any system which attaches some extra information to the original content which indicates whether or not a copy may be made. A software or hardware system must be specifically built around this scheme to recognize the additional information and interpret it in an appropriate manner. An example of such a system is the Serial Copyright Management System embedded in Digital Audio Tape (DAT) hardware. Under this system, additional information is stored on the disc immediately preceding each track of audio content which indicates whether or not it can be copied. The hardware reads this information and uses it accordingly.

A fundamental problem with Encryption and Content Extension is the "rogue engineer". An employee who helped design such a system or an individual with the knowledge and means to analyze such a system can modify it to ignore the copyright information altogether, and make unlicensed copies of the content. Cable piracy is quite common, aided by illicit decoder devices built by those who understand the technical details of the cable encryption system. Although the cable systems in question were actually based on analog RF signals, the same principle applies to digital systems.

The practical considerations of weak encryption schemes and rogue engineers have served to limit the faith which may be put in such copyright protection schemes. The invention disclosed herein serves to address these problems with conventional systems for digital distribution. It provides a way to enforce copyright online. The invention draws on techniques from two fields, cryptography, the art of scrambling messages so that only the intended recipient may read them, and steganography, a term applied to various techniques for obscuring messages so that only the intended parties to a message even know that a message has been sent, thus it is termed herein as a stega-cipher. The stega-cipher is so named because it uses the steganographic technique of hiding a message in multimedia content, in combination with multiple keys, a concept originating in cryptography. However, instead of using the keys to encrypt the content, the stega-cipher uses these keys to locate the hidden message within the content. The message itself is encrypted which serves to further protect the message, verify the validity of the message, and redistribute the information in a random manner so that anyone attempting to locate the message without the keys cannot rely on pre-supposed knowledge of the message contents as a help in locating it.

SUMMARY OF THE INVENTION

The invention disclosed herein combines two techniques, steganography—obscuring information that is otherwise in plain sight, and cryptography—scrambling information that must be sent over unsecured means, in a manner such that only the intended recipient may successfully unscramble it. The net effect of this system is to specifically watermark a piece of content so that if it is copied, it is possible to determine who owned the original from which the copies were made, and hence determine responsibility for the copies. It is also a feature of the system to uniquely identify the content to which it is applied.

For a comprehensive discussion of cryptography, its theory, applications and specific algorithms, see APPLIED CRYPTOGRAPHY, by Bruce Schneier, which is herein incorporated by reference at pages 66-68, 387-392.

Steganography is discussed briefly in THE CODE BREAKERS by David Kahn, which is herein incorporated by reference at pages xiii, 81-83, 522-526, and 873. An example application, Stego by Romana Machado, is also available for the Apple Macintosh. Stego can be found at the internet uniform resource locator "ftp://sumex-aim.stanford.edu/infomac/cmp/stego10a2.hqx". This application demonstrates in a simple steganographic technique to encode a text message into a graphical image without significantly distorting the image.

The invention improves upon the prior art by providing a manner for protecting copyright in the digital domain, which neither steganography or cryptography does. It improves specifically on steganography by making use of special keys which dictate exactly where within a larger chunk of content a message is to be hidden, and makes the task of extracting such a message without the proper key the equivalent of looking for a needle in a haystack.

The information encoded by the Stega-Cipher process serves as a watermark which identifies individual copies of content legally licensed to specific parties. It is integral with the content. It cannot be removed by omission in a transmission. It does not add any overhead to signal transmission or storage. It does allow the content to be stored to and used with traditional offline analog and digital media, without modification or significant signal degradation. These aspects of the stega-cipher all represent improvements to the art. That is, it forces would be pirates to damage the content in order to guarantee the disabling of the watermark.

The invention described herein is used for protecting and enforcing copyrights in the digital or on-line domain, where there are no physical limitations on copying copyrighted content.

The invention uniquely identifies every copy of multimedia content made using the invention, composed of digitized samples whether compressed or uncompressed, including but not limited to still digital images, digital audio, and digital video.

The invention is for use in meterware or pay-by-use systems where an online user incurs a charge each time they access a particular piece of content, or uses a software title.

The invention is for use as a general improvement to cryptographic techniques to increase the complexity of crytanalysis on a given cipher.

It is considered that the method and steps of the present invention will be modified to account for the effects of lossy compression schemes on the samples and particularly includes modification to handle MPEG compressed audio and video.

It is considered that statistical data spreading and recovery techniques, error coding or spread spectrum processing techniques might be applied in the invention to handle the effects of lossy compression, or counter the effects of a randomization attack.

It is considered that the apparatus described might be further specialized and optimized in hardware by replacing general purpose data buses and CPU or DSP driven operations with hardwired circuitry, incorporated in one or more special purpose purpose ICs.

It is considered that the apparatus will be modeled and implemented in software on general purpose computer platforms.

It is considered that stega-cipher hardware could be embedded in a consumer electronics device and used to not only identify content and copyright, but to enable use of that content.

DETAILED DESCRIPTION

I. Digital Copyright Stega-Cipher Protocol and the Decode/Encode Program

The purpose of the program described here is to watermark digital multimedia content for distribution to consumers through online services in such a way as to meet the following criteria Given a unique piece of multimedia content, composed of digitized samples, it is desirable to:
1) Uniquely identify this particular piece of content from others in a manner which is secure and undeniable (e.g. to known whether a digital audio recording is "My Way" by Frank Sinatra, or "Stairway to Heaven", by Led Zeppelin), and in a manner such as this identification can be performed automatically by an electronic device or mechanism.
2) Uniquely identify the copyright owner of the content, and the terms under which it may be distributed in general, in a manner which is secure and undeniable.
3) At such time as is necessary, additionally, uniquely identify in a secure and undeniable manner the licensed publisher who received a particular copy of the content, and the terms under which they may redistribute or resell it.
4) At such time as is necessary, additionally, uniquely identify in a secure and undeniable manner, the licensed subscriber who received a particular copy of the content from the publisher described in item 3.

The program described in more detail below combines the techniques of cryptography and steganography to hide a securely encrypted digital copyright certificate which contains information satisfying the criteria listed above, in such a manner as to be integral with the content, like a watermark on paper, so that possession of the content dictates possession of the watermark information. In addition, the watermark cannot be "found" or successfully decoded, without possession of the correct "masks" or keys, available only to those legitimately authorized, namely, those parties to a commercial transaction involving the sale of a copy of the content. Finally, the ability to distribute such watermarked content in a system which implements the watermark scheme is denied without a successfully decoded watermark. Because well known and tested cryptographic techniques are used to protect the certificate itself, these certificates are virtually impossible to forge. Finally, the watermark cannot be erased without significantly damaging the content.

The basic program represents a key part of the invention itself. This program is then used as the method by which copyright information is to be associated in an integral manner with the content. This is a concept absent from copy protection, encryption and content extension schemes. The copyright information itself can be made undeniable and unforgeable using cryptographic techniques, so that through it an audit trail of ownership may be established for each copy of a given piece of content, thus customizing each copy to a particular owner, in a way that can be used to identify the owner.

The value of the stega-cipher is that it provides a way to watermark the content in a way that changes it slightly, but does not impact human perception significantly. And, furthermore, that it is made difficult to defeat since one must know exactly where the information resides to extract it for analysis and use in forgery attempts, or to remove it without overly degrading the signal. And, to try to force copyright information one must first be able to analyze the encrypted copyright information, and in order to do that, one must be able to find it, which requires masks.

II. Example Embodiment of General Processing

Digital audio data is represented by a series of samples in 1 dimension, $\{S_1, S_2, S_3 \ldots S_n\}$ This series is also referred to as a sample stream. The sample stream approximates an analog waveform of sound amplitude over time. Each sample represents an estimate of the wave amplitude at the instant of time the sample is recorded. For monaural audio, there is one such sample stream. Stereo audio is comprised of two sample streams, one representing the right channel, and the other representing the left. Each stream is used to drive a corresponding speaker to reproduce the stereo sound.

What is referred to as CD quality audio is characterized by 16 bit (2 byte) stereo samples, recorded at 44.1 Khz, or 44,100 samples per second in each channel. The dynamic range of sound reproduction is directly proportional to the number of bits per sample. Some lower quality recordings are done at 8 bits. A CD audio recording can be stored using any scheme for containing the 2 sample streams in their entirety. When these streams are played back at the same frequency they were recorded at, the sound recorded is reproduced to a high degree of accuracy.

The sample is processed in order from first sample to last. For the purpose of the invention disclosed, the stream is separated into sample windows, each of which has a fixed number of consecutive samples from the stream, and where windows do not overlap in the sample stream. Windows may be contiguous in the sample stream. In this discussion assume each window contains 128 samples, and that windows are contiguous. So, the windows within the stream look like $\{[S_1, S_2, S_3 \ldots S_{128}], [S_{129}, S_{130}, S_{131} \ldots S_{256}], \ldots [S_{n-128} \ldots S_n]\}$ where [ . . . ] denotes each window and any odd samples at the end of the stream which do not completely fill a window can be ignored, and simply passed through the system unmodified.

These windows will be used as input for the discrete Fast Fourier Transform (and its inverse) operation.

Briefly, Fourier Transform methods are based on the principle that a complex waveform, expressed as amplitude over time and represented by a sample stream, is really the sum of a number of simple waveforms, each of which oscillate at different frequencies.

By complex, it is meant that the value of the next sample is not easily predicted from the values of the last N samples or the time of the sample. By simple it is meant that the value of the sample is easily predictable from the values of the last N samples and/or the time of the sample.

The sum of multiple simple waves is equivalent to the complex wave. The discrete FFT and its inverse simply translate a limited amount of data from one side of this equivalence to the other, between the complex waveform and the sum of simple waves. The discrete FFT can be used to translate a series of samples representing amplitude over time (the complex wave, representing a digital audio recording) into the same number of samples representing total spectral energy in a given range of frequencies (the simple wave components) at a particular instant of time. This instant is the time in the middle of the original amplitude/time samples. The inverse discrete FFT translates the data in the other direction, producing the complex waveform, from its simpler parts.

Each 128 sample window will be used as an input to the discrete FFT, resulting in 128 bins representing each of 128 frequency bands, ranging from 0 Hz to 22 Khz (the Nyquist frequency, or ½ the sampling rate).

Information can be encoded into the audio signal in the frequency domain or in the time domain. In the latter case, no FFT or inverse FFT is necessary. However, encoding in the frequency domain is recommended, since its effects are scattered over the resultant time domain samples, and not easily predicated. In addition, frequency domain encoding makes it more likely that randomization will result in noticeable artifacts in the resultant signal, and therefore makes the stega-cipher more defensible against such attacks. It is in the frequency domain that additional information will be encoded into the audio signal for the purpose of this discussion. Each frequency band in a given time slice can potentially be used to store a small portion of some additional information to be added to the signal. Since these are discrete estimates, there is some room for error which will not significantly effect the perceived quality of the signal, reproduced after modification, by the inverse FFT operation. In effect, intentional changes, which cannot be distinguished from random variations are introduced in the frequency domain, for the purpose of storing additional information in the sample stream.

These changes are minimized so as not to adversely affect the perceived quality of the reproduced audio signal, after it has been encoded with additional information in the manner described below. In addition, the location of each of these changes is made virtually impossible to predict, an innovation which distinguishes this scheme from simple steganographic techniques.

Note that this process differs from the Nagata, et al. U.S. Pat. Nos. 4,979,210 and 5,073,925, which encode information by modulating an audio signal in amplitude/time domain. It also differs in that the modulations introduced in the Nagata process (which are at very low amplitude and frequency relative to the carrier wave as to remain inaudible) carry only copy/don't copy information, which is easily found and circumvented by one skilled in the art. Also, there is no limitation in the stega-cipher process at to what type of information can be encoded into the signal, and there is more information storage capacity, since the encoding process is not bound by any particular frequency of modulation but rather by the number of samples available. The granularity of encoding in the stega-cipher is determined by the sample window size, with potentially 1 bit of space per sample or 128 bits per window (a secure implementation will halve this to 64 bits). In Nagata, et al. the granularity of encoding is fixed by the amplitude and frequency modulation limits required to maintain inaudibility. These limits are relatively low, and therefore make it impractical to encode more than simple copy/don't copy information using the Nagata process.

III. Example Embodiment of Encoding and Decoding

A modification to standard steganographic technique is applied in the frequency domain described above, in order to encode additional information into the audio signal.

In a scheme adapted from cryptographic techniques, 2 keys are used in the actual encode and decode process. For the purposes of this invention the keys are referred to as masks. One mask, the primary, is applied to the frequency axis of FFT results, the other mask is applied to the time axis (this will be called the convolution mask). The number of bits comprising the primary mask are equal to the sample window size in samples (or the number of frequency bands computed by the FFT process), 128 in this discussion. The number of bits in the convolution mask are entirely arbitrary. This implementation will assume a time mask of 1024 bits. Generally the larger the key, the more difficult it is to guess.

Prior to encoding, the primary and convolution masks described above are generated by a cryptographically secure random generation process. It is possible to use a block cipher like DES in combination with a sufficiently pseudo-random seed value to emulate a cryptographically secure random bit generator. These keys will be saved along with information matching them to the sample stream in question in a database for use in decoding, should that step become necessary.

Prior to encoding, some additional information to be encoded into the signal is prepared and made available to the encoder, in a bit addressable manner (so that it may be read one bit at a time). If the size of the sample stream is known and the efficiency characteristics of the stega-cipher implementation are taken into account, a known limit may be imposed on the amount of this additional information.

The encoder captures one sample window at a time from the sample stream, in sequential, contiguous order. The encoder tracks the sequential number of each window it acquires. The first window is 0. When the number of windows processed reaches the number of bits in the window mask, minus one, the next value of the window counter will be reset to 0.

This counter is the convolution index or phase. In the current implementation it is used as a simple index into the convolution bitmask. In anticipated developments it will be used to perform convolution operations on the convolution mask to determine which bit to use. For instance the mask might by rotated by a number corresponding to the phase, in bits to the left and XORed with the primary mask to produce a new mask, which is then indexed by the phase. There are many possibilities for convolution.

The encoder computes the discrete FFT of the sample window.

Starting with the lowest frequency band, the encoder proceeds through each band to the highest, visiting each of the 128 frequency bands in order. At each band value, the encoder takes the bit of the primary mask corresponding to the frequency band in question, the bit of the convolution mask corresponding to the window in question, and passes these values into a boolean function. This function is designed so that it has a near perfectly random output distribution. It will return true for approximately 50% of its input permutations, and false for the other 50%. The value returned for a given set of inputs is fixed, however, so that it will always return the same value given the same set of inputs.

If the function returns true, the current frequency band in the current window is used in the encoding process, and represents a valid piece of the additional information encoded in the signal. If the function returns false, this cell, as the frequency band in a given window is called, is ignored in the process. In this manner it is made extremely difficult to extract the encoded information from the signal without the use of the exact masks used in the encoding process. This is one place in which the stega-cipher process departs from traditional steganographic implementations, which offer a trivial decode opportunity if one knows the information is present. While this increases the information storage capacity of the carrier signal, it makes decoding trivial, and further degrades the signal. Note that it is possible and desirable to modify the boolean cell flag function so that it returns true <50% of the time. In general, the fewer cells actually used in the encode, the more difficult they will be to find and the less degradation of content will be caused, provided the function is designed correctly. There is an obvious tradeoff in storage capacity for this increased security and quality.

The encoder proceeds in this manner until a complete copy of the additional information has been encoded in the carrier signal. It will be desirable to have the encoder encode multiple copies of the additional information continuously over the duration of the carrier signal, so that a complete instance of this information may be recovered from a smaller segment of a larger signal which has been split into discontinuous pieces or otherwise edited. It is therefore desirable to minimize the size of the information to be encoded using both compact design and pre-encoding compression, thus maximizing redundant encoding, and recoverability from smaller segments. In a practical implementation of this system it is likely the information will be first compressed by a known method, and then encrypted using public-key techniques, before being encoded into the carrier signal.

The encoder will also prepare the package of additional information so that it contains an easily recognizable start of message delimeter, which can be unique to each encoding and stored along with the keys, to serve as a synchronization signal to a decoder. The detection of this delimeter in a decoding window signifies that the decoder can be reasonably sure it is aligned to the sample stream correctly and can proceed in a methodic window by window manner. These delimeters will require a number of bits which minimizes the probability that this bit sequence is not reproduced in a random occurrence, causing an accidental misalignment of the decoder. A minimum of 256 bits is recommended. In the current implementation 1024 bits representing a start of message delimeter are used. If each sample is random, then each bit has a 50% probably of matching the delimeter and the conditional probability of a random match would be $\frac{1}{2}^{1024}$. In practice, the samples are probably somewhat less than random, increasing the probability of a match somewhat.

The decode process uses the same masks in the same manner, only in this case the information is extracted one bit at a time from the carrier signal.

The decoder is assumed to have access to the proper masks used to encode the information originally. These masks might be present in a database, which can be indexed by a value, or values computed from the original content, in a manner insensitive to the modifications to the content caused by the stega-cipher process. So, given an arbitrary piece of content, a decoder might first process the content to generate certain key values, and then retrieve the decode masks associated with the matching key values from the database. In the case where multiple matches occur, or none are found, it is conceivable that all mask sets in the database could be tried sequentially until a valid decode is achieved, or not, indicating no information is present.

In the application of this process, it is anticipated that encoding operations may be done on a given piece of content up to 3 times, each adding new information and using new masks, over a sub-segment of the content, and that decode operations will be done infrequently. It is anticipated that should it become necessary to do a search of a large number of masks to find a valid decode, that this process can be optimized using a guessing technique based on close key matching, and that it is not a time critical application, so it will be feasible to test large numbers of potential masks for validity on a given piece of content, even if such a process takes days or weeks on powerful computers to do a comprehensive search of known mask sets.

The decode process is slightly different in the following respect. Whereas the encoding process can start at any arbitrary point in the sample stream, the decode process does not known where the encode process began (the exact offset in samples to the start of the first window). Even though the encode process, by convention, starts with sample 0, there is no guarantee that the sample stream has not been edited since encoding, leaving a partial window at the start of the sample stream, and thus requiring the decoder to find the first complete window to start the decode. Therefore, the decode process will start at the first sample, and shift the sample window along by 1 sample, keeping the window index at 0, until it can find a valid decode delimeter encoded in the window. At this point, the decoder knows it has synchronized to the encoder, and can then proceed to process contiguous windows in a more expedient manner.

Example Calculations based on the described implementations for adding copyright certificate information to CD quality digital audio:

In a stream of samples, every 128 samples will contain, on average 64 bits of certificate related information. Digital audio is composed of 16 bit samples, at 44.1 Khz, or 44,100 samples per second. Stereo audio provides 2 streams of information at this rate, left and right, or 88,200 samples per second. That yields approximately 689 contiguous sample windows (of 128 samples) per second in which to encode information. Assume a song is 4 minutes long, or 240 seconds. This yields 240*689=165,360 windows, which on average (50% utilization) contain 64 bits (8 bytes) each of certificate information. This in turn gives approximately 1291 Kb of information storage space per 4 minute stereo song (1.2 MB). There is ample room for redundant encoding of information continuously over the length of the content. Encoding 8 bytes for every 256 bytes represents 3.1% of the signal information. Assuming that a copyright certificate requires at most approximately 2048 bytes (2K), we can encode the same certificate in 645 distinct locations within the recording, or approximately every $\frac{37}{100}$ths of a second.

Now to account for delimeters and synchronization information. Assuming a sync marker of 1024 bits to avoid random matches, then we could prefix each 2K certificate block with this 1024 bit marker. It takes 256 windows to store 2K, and under this proposed scheme, the first 16 windows are reserved for the sync marker. A decoder could search for this marker by progressively matching each of the first 16 windows (64 bits at a time) against the corresponding portion of the sync marker. The decoder could reset the match advancing through the sample stream, as soon as one window did not conform to the sync marker. and proceed in this manner until it matches 16 consecutive windows to the marker, at which point it is synchronized.

Under this scheme, 240 windows, or 1.92K remain for storing certificate information, which is not unreasonable.

IV. Possible Problems, Attacks and Subsequent Defenses

A. Randomization

The attacker simply randomizes the least significant bits of each data point in the transform buffer, obliterating the synchronization signal and the watermark. While this attack can remove the watermark, in the context in which stega-cipher is to be used, the problem of piracy is kept to a minimum at least equal to that afforded by traditional media, since the system will not allow an unwatermarked piece of content to be traded for profit and watermarks cannot be forged without the proper keys, which are computationally difficult to obtain by brute-force or crytanalysis. In addition, if the encoding is managed in such a way as to maximize the level of changes to the sample stream to be just at the threshold below human perception, and the scheme is implemented to anticipate randomization attempts, it is possible to force the randomization level to exceed the level that can be perceived and create destructive artifacts in the signal, in much the same manner as a VHS cassette can be manufactured at a minimal signal level, so that a single copy results in unwatchable static.

B. Low Bit-Depth Bitmaps (Black & White Images)

These bitmaps would be too sensitive to the steganization process, resulting in unacceptable signal degradation, and so are not good candidates for the stega-cipher process. The problem may be circumvented by inflating bit-depth, although this is an inefficient use of space and bandwidth.

C. Non-Integer Transforms

The FFT is used to generate spectral energy information for a given audio signal. This information is not usually in integer format. Computers use methods of approximation in these cases to represent the real numbers (whole numbers plus fractional amounts). Depending on the exact value of the number to be represented slight errors, produced by rounding off the nearest real number that can be completely specified by the computer occur. This will produce some randomization in the least significant bit or bits. In other words, the same operation on the same sample window might yield slightly different transform values each time. It is possible to circumvent this problem using a modification to the simple LSB steganographic technique described later. Instead of looking at the LSB, the stega-cipher can use an energy quantization technique in place of the LSB method. Some variant of rounding the spectral energy values up or down, with a granularity greater than the rounding error should work, without significantly degrading the output samples.

V. A Method and Protocol for Using the Stega-Cipher

The apparatus described in the claims below operates on a window by window basis over the sample stream. It has no knowledge of the nature of the specific message to be encoded. It merely indexes into a bit stream, and encodes as many of those bits as possible into a given sample window, using a map determined by the given masks.

The value of encoding information into a single window in the sample stream using such an apparatus may not be inherently apparent until one examines the manner in which such information will be used. The protocol discussed in this section details how messages which exceed the encoding capacity of a single sample window (128 samples) may be assembled from smaller pieces encoded in the individual windows and used to defend copyrights in an online situation.

An average of 64 bits can be encoded into each window, which equals only 8 bytes. Messages larger than 8 bytes can be encoded by simply dividing the messages up and encoding small portions into a string of consecutive windows in the sample stream. Since the keys determine exactly how many bits will be encoded per window, and an element of randomness is desirable, as opposed to perfect predictability, one cannot be certain exactly how many bits are encoded into each window.

The start of each message is marked by a special start of message delimiter, which, as discussed above is 1024 bits, or 128 bytes. Therefore, if precisely 8 bytes are encoded per window, the first 16 windows of any useable message in the system described here are reserved for the start of message delimiter. For the encoder, this scheme presents little challenge. It simply designates the first sample window in the stream to be window 0, and proceeds to encode the message delimiter, bit-by-bit into each consecutive window. As soon as it has processed the last bit of the SOM delimiter it continues by encoding 32 bits representing the size, in bytes of the complete message to follow. Once the 32nd and final bit of the size is encoded, the message itself is encoded into each consecutive window, one bit at a time. Some windows may contain more encoded bits than others, as dictated by the masks. As the encoder processes each window in the content it increments its window counter. It uses this counter to index into the window mask. If the number of windows required to encode a complete message is greater than the size of this mask, 256 bits in this case, or 256 windows, then it simply resets the counter after window 255, and so on, until a complete message is encoded. It can then start over, or start on a new message.

The decoder has a bigger challenge to face. The decoder is given a set of masks, just like encoder. Unlike the encoder, the decoder cannot be sure that the first series of 128 samples it receives are the window 0 start of message, encoded by the decoder. The sample stream originally produced by an encoder may have been edited by clipping its ends randomly or splicing pieces together. In that case, the particular copy of the message that was clipped is unrecoverable. The decoder has the start of message delimiter used to encode the message that the decoder is looking for. In the initial state, the decoder assumes the first window it gets is window 0. It then decodes the proper number of bits dictated by the masks it was given. It compares these bits to the corresponding bits of the start of message delimiter. If they match, the decoder assumes it is still aligned, increments the window counter and continues. If the bits do not match, the decoder knows it is not aligned. In this case, it shifts once more sample onto the end of the sample buffer, discarding the first sample, and starts over. The window counter is set to 0. The decoder searches one sample at a time for an alignment lock. The decoder proceeds in this manner until it has decoded a complete match to the start of message delimiter or it exhausts the sample stream without decoding a message. If the decoder can match completely the start of message delimiter bit sequence, it switches into aligned mode. The decoder will now advance through the sample stream a full window at a time (128 samples). It proceeds until it has the 32 bits specifying the message size. This generally won't occupy more than 1 complete window. When the decoder has locked onto the start of message delimiter and decoded the message size, it can now proceed to decode as many consecutive additional windows as necessary until it has decoded a complete message. Once it has decoded a complete message, the state of the decoder can be reset to un-synchronized and the entire process can be repeated starting with the next 128 sample window. In this manner it is not absolutely necessary that encoding windows be contiguous in the sample stream. The decoder is capable of handling random intervals between the end of one message and the start of another.

It is important to note that the circuit for encoding and decoding a sample window does not need to be aware of the nature of the message, or of any structure beyond the start of message delimiter and message size. It only needs to consider a single sample window, its own state (whether the decoder is misaligned, synchronizing, or synchronized) and what bits to encode/decode.

Given that the stega-cipher apparatus allows for the encoding and decoding of arbitrary messages in this manner, how can it be used to protect copyrights?

The most important aspect of the stega-cipher in this respect is that fact that it makes the message integral with the content, and difficult to remove. So it cannot be eliminated simply by removing certain information prepended or appended to the sample stream itself. In fact, removing an arbitrary chunk of samples will not generally defeat the stega-cipher either.

Given that some information can thus be integrated with the content itself, the question is then how best to take advantage of this arrangement in order to protect copyrights.

The following protocol details how the stega-cipher will be exploited to protect copyrights in the digital domain.

In a transaction involving the transfer of digitized content, there are at least 3 functions involved:

The Authority is a trusted arbitrator between the two other functions listed below, representing parties who actually engage in the transfer of the content. The Authority maintains a database containing information on the particular piece of content itself and who the two parties engaged in transferring the content are. The Authority can perform stega-cipher encoding and decoding on content.

The Publisher, or online distributor is the entity which is sending the copyrighted content to another party. The Publisher can perform stega-cipher encoding and decoding on content.

The Consumer is the person or entity receiving the copyrighted content, generally in exchange for some consideration such as money. The consumer cannot generally perform stega-cipher encoding or decoding on content.

Each of these parties can participate in a message exchange protocol using well known public-key cryptographic techniques. For instance, a system licensing RSA public key algorithms might be used for signed and encrypted message exchange. This means that each party maintains a public key/private key pair, and that the public keys of each party are freely available to any other party. Generally, the Authority communicates via electronic links directly only to the Publisher and the Consumer communicates directly only with the publisher.

Below is an example of how the protocol operates from the time a piece of content enters an electronic distribution system to the time it is delivered to a Consumer.

A copyright holder (an independent artist, music publisher, movie studio, etc.) wishes to retail a particular title online. For instance, Sire Records Company might wish to distribute the latest single from Seal, one of their musical artists, online. Sire delivers a master copy of this single, "Prayer for the Dying", to the Authority, Ethical Inc. Ethical converts the title into a format suitable for electronic distribution. This may involve digitizing an analog recording. The title has now become content in the context of this online distribution system. The title is not yet available to anyone except Ethical Inc., and has not yet been encoded with the stega-cipher watermark. Ethical generates a Title Identification and Authentication (TIA) certificate. The certificate could be in any format. In this example it is a short text file, readable with a small word-processing program, which contains information identifying
the title
the artist
the copyright holder
the body to which royalties should be paid
general terms for publishers' distribution
any other information helpful in identifying this content Ethical then signs the TIA with its own private key, and encrypts the TIA certificate plus its signature with its own public key. Thus, the Ethical can decrypt the TIA certificate at a later time and know that it generated the message and that the contents of the message have not been changed since generation.

Sire Records, which ultimately controls distribution of the content, communicates to the Ethical a specific online Publisher that is to have the right of distribution of this content. For instance, Joe's Online Emporium. The Authority, Ethical Inc. can transmit a short agreement the Distribution Agreement to the Publisher, Joe's Online Emporium which lists
the content title
the publisher's identification
the terms of distribution
any consideration paid for the right to distribute the content
a brief statement of agreement with all terms listed above The Publisher receives this agreement, and signs it using its private key. Thus, any party with access to the Joe's Online Emporium's public key could verify that Joe's signed the agreement, and that the agreement has not been changed since Joe's signed it. The Publisher transmits the signed Distribution Agreement to the Authority, Ethical Inc.

Ethical Inc. now combines the signed TIA certificate and the Distribution Agreement into a single message, and signs the entire message using its private key. Ethical has now created a Publisher Identification message to go in its own stega-cipher channel into the content. Ethical Inc. now generates new stega-cipher masks and encodes this message into a copy of the content using a stega-cipher encoder. The Authority saves the masks as a Receipt in a database, along with information on the details of the transfer, including the title, artist and publisher.

Ethical then transfers this watermarked copy to the Joe's Online Emporium, the Publisher. Well known encryption methods could be used to protect the transfer between the Authority and the Publisher. The Authority may now destroy its copy, which the Publisher has received. The Publisher, Joe's Online Emporium now assumes responsibility for any copies made to its version of the content, which is a Publisher Master copy.

Finally, the Consumer, John Q. Public wishes to purchase a copy of the content from Joe's Online Emporium. Joe's Emporium sends the John Q. Public a short agreement via an electronic communication link, similar to Publisher's Distribution Agreement, only this is a Purchase Agreement, which lists
the content title
consumer identification
the terms of distribution
the consideration pas for the content
a brief statement of agreement with the terms above John Q. Public signs this agreement with his private key and returns it to the Joe's Online Emporium. The Publisher, Joe's prepares to encode its own stega-cipher watermark onto a copy of the content by generating a set of masks for the algorithm. Joe's Online Emporium then stores these masks (a receipt) in its own database, indexed by title and consumer. Joe's Online Emporium signs the agreement received from John Q. Public with the Emporium's own private key, and forwards it to the Authority, Ethical Inc., along with a copy of the masks. It is important to note that this communication should be done over a secured channel. The Authority verifies the Publisher and Consumer information and adds it own signature to the end of the message, approving the transaction, creating a Contract of Sale. The Authority adds the Publisher's receipt (mask set) to its database, indexed by the title, the publisher, and the consumer identification. The Authority signs the Contract of Sale by encrypting it with their private key. So anyone with the Authority's public key (any Publisher) could decrypt the Contract of Sale and verify it, once it was extracted from the content. The Publisher then transmits the signed Contract of Sale back to the Publisher, who uses a stega-cipher device to imprint this Contract as its own watermark over the content. The Publisher then transmits the newly watermarked copy to the Consumer, who is accepting responsibility for it. The Publisher destroys their version of the consumer's copy.

If this procedure is followed for all content distribution within such an online system then it should be possible for the Authority to identify the owner of a piece of content which appears to be unauthorized. The Authority could simply try its database of stega-cipher keys to decode the watermark in the content in question. For instance, if a copy of Seal's latest single originally distributed with stega-cipher watermarks showed up on an Internet ftp site the Authority should be able to extract a TIA Certificate and Distribution Agreement or a Contract of Sale identifying the responsible party. If a Publisher sold this particular copy to a Consumer, that particular publisher should be able to extract a Contract of Sale, which places responsibility with the Consumer. This is not a time critical application, so even if it takes days or weeks, it is still worthwhile.

In a modification to the protocol discussed above, each Publisher might act as its own Authority. However, in the context of online services, this could open avenues of fraud committed by the collusion of certain Publishers and Consumers. Using an Authority, or one of several available Authorities to keep records of Publisher-Consumer transactions and verify their details decreases the likelihood of such events.

It should also be obvious that a similar watermarking system could be used by an individual entity to watermark its own content for its own purposes, whether online or in physical media. For instance, a CD manufacturer could incorporate unique stega-cipher watermarks into specific batches of its compact discs to identify the source of a pirate ring, or to identify unauthorized digital copies made from its discs. This is possible because the stega-cipher encoding works with the existing formats of digital samples and does not add any new structures to the sample data that cannot be handled on electronic or mechanical systems which predate the stega-cipher.

VI. Increasing Confidence in the Stega-Cipher

The addition of a special pre-encoding process can make stega-cipher certificates even more secure and undeniable. Hash values may be incorporated which match exactly the content containing the watermark to the message in the watermark itself. This allows us a verification that the watermark decoded was encoded by whomever signed it into this precise location in this specific content.

Suppose one wants to use a 256 bit (32 byte) hash value which is calculated with a secure one-way hash function over each sample in each sample window that will contain the message. The hash starts with a seed value, and each sample that would be processed by the encoder when encoding the message is incorporated into the hash as it is processed. The result is a 256 bit number one can be highly confident is unique, or sufficiently rare to make intentionally duplicating it with another series of samples difficult.

It is important that the hash function be insensitive to any changes in the samples induced by the stega-cipher itself. For instance, one might ignore the least significant bit of each sample when computing the hash function, if the stega-cipher was implemented using a least significant bit encode mode.

Based on the size of the non-hash message, one knows the hash-inclusive message requires 32 more bytes of space. Once can now calculate the size of a signed encrypted copy of this message by signing and encrypting exactly as many random bytes as are in the message, and measuring the size of the output in bytes. One now knows the size of the message to be encoded. One can pre-process the sample stream as follows.

Proceed through stega-cipher encode loop as described in the claims. Instead of encoding, however, calculate hash values for each window series which will contain the message, as each sample is processed. At the end of each instance of "encoding" take the resultant hash value and use it to create a unique copy of the message which includes the hash value particular to the series of sample windows that will be used to encode the message. Sign and encrypt this copy of the message, and save it for encoding in the same place in the sample stream.

A memory efficient version of this scheme could keep on hand the un-hashed message, and as it creates each new copy, back up in the sample stream to the first window in the series and actually encode each message, disposing of its afterwards.

The important result is evident on decoding. The decoding party can calculate the same hash used to encode the message for themselves, but on the encoded samples. If the value calculated by the decoding party does not match the value contained in the signed message, the decoder is alerted to the fact that this watermark was transplanted from somewhere else. This is possible only with a hash function which ignores the changes made by the stega-cipher after the hash in the watermark was generated.

This scheme makes it impossible to transplant watermarks, even with the keys to the stega-cipher.

APPENDIX

Psuedo-code

```
const int WINDOW-- RESET = 256;
const int WINDOW-- SIZE = 128;
const int MARKER-- BITS = 1024;
const int CHUNK-- BITS = 2048 * 8;
int window-- offset;
int msg-- bit-- offset;
int frequency-- offset;
Boolean useCell;
/* 8 bits per bye, 1 byte per char */
unsigned char frequency-- mask[WINDOW-- SIZE/8];
unsigned char window-- mask[WINDOW-- RESET/8];
unsigned char msg-- start-- marker[MARKER-- BITS/8];
unsigned char msg-- end-- marker[MARKER-- BITS/8];
Int16 amplitude-- sample-- buffer[WINDOW-- SIZE];
float power-- frequency-- buffer[WINDOW-- SIZE];
unsigned char message-- buffer[CHUNK-- BITS/8];
void doFFT(Int16 *amp-- sample-- buffer, float *power--
freq-- buffer,int size);
void doInverseFFT(Int16 *amp-- sample-- buffer, float
*power-- freq-- buffer,int size);
void initialize( );
Bit getBit(unsigned char *buffer,int bitOffset);
Boolean map(Bit window-- bit, Bit band-- bit, int window, int
frequency);
Boolean getSamples(Int16 *amplitude-- sample-- buffer,int
samples);
void encode( )
void initialize( )
```

APPENDIX-continued

Psuedo-code

```
{
/* message to be encoded is generated */
/* message is prefixed with 1024 bit msg-- start-- marker */
/* message is suffixed with 1024 bit msg-- end -- marker */
/* remaining space at end of message buffer padded with random bits */
window-- offset = 0;
msg-- bit-- offset = 0;
frequency-- offset = 0;
frequency-- mask loaded
window-- mask loaded
zeroAmpSampleBuffer( );
}
Boolean getSamples(Int16 *buffer,int samples)
{
/* get samples number of samples and shift them contiguously into the
sample
buffer from right to left*/
if(samples < samples available)
return false;
else
return true;
}
void doFFT(int16 *sample-- buffer, float *spectrum-- buffer,
int size)
{
calculate FFT on sample-- buffer, for size samples
store result in spectrum buffer
}
void doInverseFFT(Int16 *sample-- buffer,float *spectrum--
buffer,int size)
{
calculate inverse FFT on spectrum-- buffer
store result in sampe-- buffer
}
Bit getBit(unsigned char *buffer,in bitOffset)
{
returns value of specified bit in specified buffer
either 0 or 1, could use Boolean (true/false) values for bit set of bit
off
}
Boolean map(Bit window-- bit,Bit band-- bit,int window, int
frequency--
{
/* this is the function that makes the information difficult to find */
/* the inputs window-- bit and band-- bit depend only on the
mask values
used for encoding the information, they are 1) random, 2) secret */
/* window and frequency values are used add time and frequency band
dependent
complexity to this function */
/* this function is equivalent to a Boolean truth TABLE with window *
frequency * 4
possible input combinations and 2 possible output */
/* for any input combination, the output is either true or false */
/* window ranges from 0 to WINDOW-- RESET -1 */
/* frequency ranges from 0 to WINDOW-- SIZE - 1 */
return calculated truth value
}
void encodeBit(float *spectrum-- buffer,int freq-- offset,Bit
theBit)
{
/* modifies the value of the cell in spectrum-- buffer, indexed by
freq-- offset
in a manner that distinguishes each of the 2 possible values of
theBit,
1 or 0
*/
/* suggested method of setting the Least Significant bit of the cell ==
theBit */
/* alternative method of rounding the value of the cell upward or
downward to
certain fractional values proposed
i.e. <= .5 fractional remainder signifies 0, > .5 fraction remainder
signifies 1
*/
}
void encode( )
{
initialize( );
do {
if(getSamples(amplitude-- sample-- buffer) == false)
return
doFFT(amplitude-- sample-- buffer,power-- frequency--
buffer,WINDOW-- SIZE);
for (frequency-- offset = 0; frequency-- offset
< WINDOW-- SIZE;
frequency-- offset++){
useCell = map(getBit(window-- mask,window-- offset),
getBit(frequency-- mask,frequency-- offset),
window-- offset, frequency-- offset);
if(useCell == true){
encodeBit(power-- frequency-- buffer,frequency--
offset,
getBit(message-- buffer,msg-- bit-- offset));
message-- bit-- offset ++;
if(msg-- bit-- offset MESSAGEBITS){
initialize( );
break; /* exit frequency loop */
}
}
}
doInverseFFT(amplitude-- sample-- buffer,power-- frequency
-- buffer,
WINDOW-- SIZE);
outputSamples(amplitude-- sample-- buffer);
window-- offset++;
if(window-- offset == WINDOW-- RESET){
window-- offset = 0;
}
} while(true);
}
```

The encode( ) procedure processes an input sample stream using the specified frequency and window masks as well as a pre-formatted message to encode.

encode( ) processes the sample stream in windows of WIN-DOW—SIZE samples, contiguously distributed in the sample stream, so it advances WINDOW—SIZE samples at a time.

For each sample window, encode( ) first compute the FFT of the window, yielding its Power Spectrum Estimation. For each of these windows PSEs, encode( ) then uses the map( ) function to determine where in each PSE to encode the bits of the message, which it reads from the message buffer, one bit at a time. Each time map( ) returns true, encode( ) consumes another sample from the message.

After each window is encoded, encode( ) computes the inverse FFT on the PSE to generate a modified sample window, which is then output as the modified signal. It is important the sample windows NOT overlap in the sample stream, since this would potentially damage the preceding encoding windows in the stream.

Once the message is entirely encoded, including its special end of message marker bit stream, encode( ) resets it internal variables to being encoding the message once more in the next window, encode( ) proceeds in this manner until the input sample stream is exhausted.

```
enum {
Synchronizing,
Locked
}; /* decode states */
unsigned char message-- end-- buffer[MARKER-- BITS];
Bit decodeBit(float *spectrum-- buffer,int freq-- offset)
/* reads the value of the cell in spectrum-- buffer, indexed by
freq-- offset
```

-continued

```
in a manner that distinguishes each of the 2 possible values of an
encoded bit, 1 or 0
*/
/* suggested method of testing the Least Significant bit of the cell */
/* alternative method of checking the value of the cell versus certain
fractional
remainders proposed.
i.e. <= .5 fractional remainder signifies 0, > .5 fraction remainder
signifies 1
*/
return either 1 or 0 as appropriate
}
Boolean decode( )
{
/* Initialization */
state = Synchronizing
window-- offset =0;
set frequency mask
set window mask
clear sample buffer
int nextSamples = 1;
int msg-- start-- offset = 0;
clear message-- end-- buffer
Bit aBit;
Boolean bitsEqual;
do {
if(state == Synchronizing){
nextSamples = 1;
window-- offset = 0;
}
else
nextSamples = WINDOW-- SIZE;
if(getSamples(amplitude-- sample-- buffer) == false)
return false;
doFFT(amplitude-- sample-- buffer,power-- frequency-
- buffer,
WINDOW-- SIZE);/* 2 */
for (frequency-- offset = 0; frequency-- offset
< WINDOW-- SIZE;
frequency-- offset++){
useCell = map(getBit(window-- mask,window-- offset),
getBit(frequency-- mask,frequency-- offset),
window-- offset, frequency-- offset);
if(useCell == true){
aBit = decodeBit(power-- frequency-- buffer,
frequency-- offset);
setBit(message-- buffer,message-- bit-- offset,aBit);
message-- bit-- offset ++;
}
else
continue;
if(state == Synchronizing){
bitsEqual =
compareBits(message-- start-- marker,message--
buffer,
message-- bit-- offset);
if(!bitsEqual){
message-- bit-- offset = 0;
misaligned = true;
break; /* exit frequency loop */
}
else if (message-- bit-- offset == MARKER-- BITS)
state == Locked;
}
else {
/* locked onto encoded stream */
shift aBit into right side of message-- end-- buffer
bitsEqual = compareBits(message-- end-- buffer,
msg-- end-- marker,MARKER-- BITS);
if(bitsEqual)
return true;
}
}
} while (true);
}
```

The decode( ) procedure scans an input sample stream using specified window and frequency masks, until it either decodes a valid message block, storing it in a message buffer, or exhausts the sample stream.

The decode( ) procedure starts in state Synchronizing, in which it does not know where in the sample stream the encoding windows are aligned. The procedure advances the sample window through the sample stream one sample at a time, performing the FFT calculation on each window, and attempting to decode valid message bits from the window. As it extracts each bit using the map( ) function, the decode( ) procedure compares these bits against the start of message marker. As soon as a mismatch is detected, the decode( ) procedure knows it is not yet properly aligned to an encoding window, and immediately ceases decoding bits from the current window and moves to the next window, offset by 1 sample. The decode( ) procedure continues in this manner until it matches successfully the complete bitstream of a start of message marker. At this point the decode( ) procedure assumes it is aligned to an encoded message and can then decode bits to the message buffer quickly, advancing the sample window fully at each iterations. It is now in Locked mode. For each bit it stores in the message buffer when in Locked mode, the decode( ) procedure also shifts the same bit value into the least significant bit of the message—end— buffer. After each bit is decoded in Locked mode, the decode( ) procedure checks compares the message—end—buffer with the msg—end—marker in a bit by bit manner. When a complete match is found, decode( ) is finished and returns true. If the sample stream is exhausted before this occurs, decode( ) returns false. If decode( ) returns true, a valid message is stored in the message buffer, including the start and end of message markers.

REFERENCES

The following references may be of use to those lacking skill in the art of steganography or the various cryptographic techniques discussed in this document Press, Flannery, Teukolsky, and Vetterling, Numerical Recipes in C, Cambridge University Press, 1988
12. Fourier Transform Spectral Methods, pgs. 398-470
Ken C. Pohlmai, Principles of Digital Audio, 2nd ed., SAMS, 1991
B. Schneier, Applied Cryptography, John Wiley & Sons, Inc. New York 1994 particularly the following sections for steganography:
4.1 Subliminal Channel, pgs. 66-68
16.6 Subliminal Channel, pgs. 387-392
particularly the following sections for cryptography and digital signatures
Chapter 2: Protocol Building Blocks, pgs 28-41
D. Kahn, The Code Breakers, The Macmillan Company, 1969 particularly the following sections on steganography
pgs xiii, 513,515
U.S. Pat. Nos.
U.S. Pat. No. 4,908,873 Philibert et al.
U.S. Pat. No. 5,412,718 Narasimhalu, et al.
U.S. Pat. No. 4,979,210 Nagata et al.
U.S. Pat. No. 5,073,925 Nagata et al.
U.S. Pat. No. 5,287,407 Holmes
U.S. Pat. No. 4,980,782 Ginkel
U.S. Pat. No. 5,408,505 Indeck, et al.
U.S. Pat. No. 5,365,586 Indeck, et al.
U.S. Pat. No. 4,200,770 Hellman, Diffie
U.S. Pat. No. 4,218,582 M. E. Hellman and R. C Merkle
U.S. Pat. No. 4,405,829 Rivest, Shamir, Adelman
U.S. Pat. No. 4,748,668 Shamir, Fiat

What is claimed is:

1. A computer-based method for identifying digital content, the method comprising: receiving encoded digital content, wherein encoding of said encoded digital content comprises a steganographic mapping process that uses at least one of a plurality of keys; and decoding additional information from the encoded digital content using at least one of the plurality of keys, and wherein the key is derived from the encoding process; wherein the additional information includes an encode hash of at least a portion of the content and further comprising generating a decode hash of at least a portion of the content and comparing said encode hash to said decode hash.

2. The method according to claim 1, wherein the additional information includes at least one selected from the group consisting of: the title of the encoded content, the artist of the encoded content, terms of distribution of the encoded content, rights ownership identification of the encoded content, authorship identification of the encoded content, publication rights of the encoded content, ownership identification of the encoded content, and an audit trail of the encoded content.

3. The method according to claim 1, wherein the additional information includes at least one selected from the group consisting of: information for enabling use of the encoded content, meterware information for the use of the encoded content, pay-by-use information for the use of the encoded content, and payment information for access to the encoded content.

4. The method according to claim 1, wherein the key locates and extracts the additional information.

5. The method according to claim 1, wherein the key is derived from the content.

6. The method according to claim 1, wherein the key is random or pseudo random.

7. The method according to claim 1, wherein the additional information is encoded in at least two locations of the content; and further comprising using said key to decode said additional information from at least one of the two locations of the content.

8. The method according to claim 1, wherein said additional information does not perceptibly affect the encoded content.

9. The method according to claim 8, wherein the content comprises at least one selected from the following group consisting of: an analog waveform, discrete digital samples, a digital sample stream, and a compressed version of the encoded content.

10. A computer-based method for identifying digital content, the method comprising: receiving encoded digital content, wherein encoding of said encoded digital content comprises a steganographic mapping process that uses at least one of a plurality of keys; and decoding additional information from the encoded digital content using at least one of the plurality of keys, and wherein the key is derived from the encoding process; wherein the additional information includes a watermark comprising a one way function of at least a portion of the content that contains the watermark, wherein the one way function is insensitive to the encoding of the additional information; wherein the one way function generates at least one selected from the following group consisting of: a hash, a signature, a message digest and a certificate.

11. The method according to claim 1, wherein the additional information contains a signed or encrypted watermark.

12. The method according to claim 1, wherein the content was encoded by a process comprising at least one selected from the group consisting of: a steganographic process, an imperceptible encoding process, a watermarking process, a steganographic cipher process, and an information hiding process.

13. A computer-based method for encoding additional information into digital content, the method comprising:
receiving digital content to be encoded; and
encoding the additional information into the digital content, wherein the encoding comprises a steganographic cipher process that uses at least one of a plurality of keys to generate at least one unique encoded copy of the digital content, and wherein the encoded additional information is unique to the encoded copy;
wherein the additional information includes an encode hash of at least a portion of the content and further comprising generating a decode hash of at least a portion of the content and comparing said encode hash to said decode hash.

14. The method according to claim 13, wherein the key hides the additional information in at least one location in the content.

15. The method according to claim 13, wherein the key maps the additional information in at least one location in the content.

16. The method according to claim 13, wherein the key determines the size of the additional information.

17. The method according to claim 16, wherein the size of the additional information is measured in bits.

18. The method according to claim 13, wherein the key is derived from features of the content.

19. The method according to claim 18, wherein the step of deriving a key from the content is insensitive to the encoding process.

20. The method according to claim 13, wherein the additional information includes at least one selected from the group consisting of: the title of the encoded content, the artist of the encoded content, terms of distribution of the encoded content, rights ownership identification of the encoded content, authorship identification of the encoded content, publication rights of the encoded content, ownership identification of the encoded content, and an audit trail of the encoded content.

21. The method according to claim 13, wherein the key is random or pseudo random.

22. The method according to claim 13, wherein the additional information includes at least one selected from the group consisting of: information for enabling use of the encoded content, meterware information for the use of the encoded content, pay-by-use information for the use of the encoded content, and payment information for access to the encoded content.

23. The method according to claim 13, wherein the additional information is encoded in at least two locations of the content; and further comprising using said key to decode said additional information from at least one of the two locations of the content.

24. The method according to claim 13, wherein said additional information does not perceptibly affect the encoded content.

25. The method according to claim 24, wherein the content comprises at least one selected from the following group consisting of: an analog waveform, discrete digital samples, a digital sample stream, and a compressed version of the encoded content.

26. The method according to claim 13, wherein the additional information contains a signed or encrypted watermark.

27. The method according to claim 13, wherein the encoding process comprises at least one selected from the group consisting of: a steganographic process, an imperceptible encoding process, a watermarking process, a steganographic cipher process, and an information hiding process.

28. The method according to claim 13, wherein the additional information is encoded such that tampering with the additional information causes artifacts in the encoded content.

29. The method according to claim 13, wherein the key is unique to at least a portion of the additional information.

30. A computer-based method for encoding additional information into digital content, the method comprising:
receiving digital content to be encoded; and
encoding the additional information into the digital content, wherein the encoding comprises a steganographic cipher process that uses at least one of a plurality of keys to generate at least one unique encoded copy of the digital content, and wherein the encoded additional information is unique to the encoded copy;
wherein the additional information includes a watermark comprising a one way function of at least a portion of the content that contains the watermark, wherein the one way function is insensitive to the encoding of the additional information;
wherein the one way function generates at least one selected from the following group consisting of: a hash, a signature, a message digest and a certificate.

31. The method according to claim 30, further comprising generating a decode hash of at least a portion of the content that contains the watermark and comparing said encode hash to said decode hash.

32. A computer-based method for tamper proofing digital content, the method comprising:
calculating a one way function of additional information, the information comprising data to be encoded into the content and information based on the content, such that the one way function is insensitive to the changes introduced into the content by the encoding process; and
encoding the additional information into the content using a mapping function that selects one or more keys from a plurality of pre-established keys, and wherein the selected key comprises information derived from the encoding process.

33. The method according to claim 32, wherein the one way function generates at least one selected from the following group consisting of: a hash, a signature, a message digest, and a certificate.

34. A non-transitory computer-readable medium having therein stored instructions adapted to be executed by a processor, which instructions when executed result in a process comprising: receiving encoded content, wherein encoding of said encoded content comprises a steganographic mapping process that uses at least one of a plurality of keys; and decoding additional information from the encoded content using at least one of the plurality of keys, and wherein the key is derived from the encoding process; wherein the additional information includes an encode hash of at least a portion of the content and further comprising generating a decode hash of at least a portion of the content and comparing said encode hash to said decode hash.

35. The medium of claim 34, wherein the additional information includes at least one selected from the group consisting of: the title of the encoded content, the artist of the encoded content, terms of distribution of the encoded content, rights ownership identification of the encoded content, authorship identification of the encoded content, publication rights of the encoded content, ownership identification of the encoded content, and an audit trail of the encoded content.

36. The medium of claim 34, wherein the additional information includes at least one selected from the group consisting of: information for enabling use of the encoded content, meterware information for the use of the encoded content, pay-by-use information for the use of the encoded content, and payment information for access to the encoded content.

37. The medium of claim 34, wherein the key locates and extracts the additional information.

38. The medium of claim 34, wherein the key is derived from the content.

39. The medium of claim 34, wherein the key is random or pseudo random.

40. The medium of claim 34, wherein the additional information is encoded in at least two locations of the content; and further comprising using said key to decode said additional information from at least one of the two locations of the content.

41. The medium of claim 34, wherein said additional information does not perceptibly affect the encoded content.

42. The medium of claim 41, wherein the content comprises at least one selected from the following group consisting of: an analog waveform, discrete digital samples, a digital sample stream, and a compressed version of the encoded content.

43. The medium of claim 34, wherein the additional information contains a signed or encrypted watermark.

44. The medium of claim 34, wherein the content was encoded by a process comprising at least one selected from the group consisting of: a steganographic process, an imperceptible encoding process, a watermarking process, a steganographic cipher process, and an information hiding process.

45. A non-transitory computer-readable medium having therein stored instructions adapted to be executed by a processor, which instructions when executed result in a process comprising: receiving encoded content, wherein encoding of said encoded content comprises a steganographic mapping process that uses at least one of a plurality of keys; and decoding additional information from the encoded content using at least one of the plurality of keys, and wherein the key is derived from the encoding process; wherein the additional information includes a watermark comprising a one way function of at least a portion of the content that contains the watermark, wherein the one way function is insensitive to the encoding of the additional information; wherein the one way function generates at least one selected from the following group consisting of: a hash, a signature, a message digest and a certificate.

46. A non-transitory computer-readable medium having therein stored instructions adapted to be executed by a processor, which instructions when executed result in a process comprising:
receiving content to be encoded; and
encoding the additional information into the content, wherein the encoding comprises a steganographic cipher process that uses at least one of a plurality of keys to generate at least one unique encoded copy of the content, and wherein the encoded additional information is unique to the encoded copy;
wherein the additional information includes an encode hash of at least a portion of the content and further comprising generating a decode hash of at least a portion of the content and comparing said encode hash to said decode hash.

47. The medium of claim 46, wherein the key hides the additional information in at least one location in the content.

48. The medium of claim 46, wherein the key maps the additional information in at least one location in the content.

49. The medium of claim 46, wherein the key determines the size of the additional information.

50. The medium of claim 49, wherein the size of the additional information is measured in bits.

51. The medium of claim 46, wherein the key is derived from features of the content.

52. The medium of claim 51, wherein the step of deriving a key from the content is insensitive to the encoding process.

53. The medium of claim 46, wherein the additional information includes at least one selected from the group consisting of: the title of the encoded content, the artist of the encoded content, terms of distribution of the encoded content, rights ownership identification of the encoded content, authorship identification of the encoded content, publication rights of the encoded content, ownership identification of the encoded content, and an audit trail of the encoded content.

54. The medium of claim 46, wherein the key is random or pseudo random.

55. The medium of claim 46, wherein the additional information includes at least one selected from the group consisting of: information for enabling use of the encoded content, meterware information for the use of the encoded content, pay-by-use information for the use of the encoded content, and payment information for access to the encoded content.

56. The medium of claim 46, wherein the additional information is encoded in at least two locations of the content; and further comprising using said key to decode said additional information from at least one of the two locations of the content.

57. The medium of claim 46, wherein said additional information does not perceptibly affect the encoded content.

58. The medium of claim 57, wherein the content comprises at least one selected from the following group consisting of: an analog waveform, discrete digital samples, a digital sample stream, and a compressed version of the encoded content.

59. The medium of claim 46, wherein the additional information contains a signed or encrypted watermark.

60. The medium of claim 46, wherein the encoding process comprises at least one selected from the group consisting of: a steganographic process, an imperceptible encoding process, a watermarking process, a steganographic cipher process, and an information hiding process.

61. The medium of claim 46, wherein the additional information is encoded such that tampering with the additional information causes artifacts in the encoded content.

62. The medium of claim 46, wherein the key is unique to at least a portion of the additional information.

63. A non-transitory computer-readable medium having therein stored instructions adapted to be executed by a processor, which instructions when executed result in a process comprising:
receiving content to be encoded; and
encoding the additional information into the content, wherein the encoding comprises a steganographic cipher process that uses at least one of a plurality of keys to generate at least one unique encoded copy of the content, and wherein the encoded additional information is unique to the encoded copy;
wherein the additional information includes a watermark comprising a one way function of at least a portion of the content that contains the watermark, wherein the one way function is insensitive to the encoding of the additional information;
wherein the one way function generates at least one selected from the following group consisting of: a hash, a signature, a message digest and a certificate.

64. The medium of claim 63, further comprising generating a decode hash of at least a portion of the content that contains the watermark and comparing said encode hash to said decode hash.

65. A non-transitory computer-readable medium having therein stored instructions adapted to be executed by a processor, which instructions when executed result in a process comprising:
calculating a one way function of additional information, the information comprising data to be encoded into the content and information based on the content, such that the one way function is insensitive to the changes introduced into the content by the encoding process; and
encoding the additional information into the content using a mapping function that selects one or more keys from a plurality of preestablished keys, and wherein the selected key comprises information derived from the encoding process.

66. The medium of claim 65, wherein the calculated one way function generates at least one selected from the following group consisting of: a hash, a signature, a message digest, and a certificate.

67. A system for identifying content, the system comprising: a receiver for receiving encoded content, wherein encoding of said encoded content comprises a steganographic mapping process that uses at least one of a plurality of keys; and a decoder, said decoder comprising at least one of (1) a CPU and non transitory memory storing a decode algorithm and (2) hardwired circuitry designed to execute said decode algorithm, said decoder designed to use said decode algorithm for decoding additional information from the encoded content using at least one of the plurality of keys, wherein the key is derived from the encoding process; wherein the additional information includes an encode hash of at least a portion of the content and further comprising a generator for generating a decode hash of at least a portion of the content and a comparator for comparing said encode hash to said decode hash.

68. The system according to claim 67, wherein the additional information includes at least one selected from the group consisting of: the title of the encoded content, the artist of the encoded content, terms of distribution of the encoded content, rights ownership identification of the encoded content, authorship identification of the encoded content, publication rights of the encoded content, ownership identification of the encoded content, and an audit trail of the encoded content.

69. The system according to claim 67, wherein the additional information includes at least one selected from the group consisting of: information for enabling use of the encoded content, meterware information for the use of the encoded content, pay-by-use information for the use of the encoded content, and payment information for access to the encoded content.

70. The system according to claim 67, wherein the decoder uses a key to locate and extract the additional information.

71. The system according to claim 67, wherein the key is derived from the content.

72. The system according to claim 67, wherein the key is random or pseudo random.

73. The system according to claim 67, wherein the additional information is encoded in at least two locations of the content; and further comprising using said decoder to use said key to decode said additional information from at least one of the two locations of the content.

74. The system according to claim 67, wherein said additional information does not perceptibly affect the encoded content.

75. The system according to claim 74, wherein the content comprises at least one selected from the following group consisting of: an analog waveform, discrete digital samples, a digital sample stream, and a compressed version of the encoded content.

76. The system according to claim 67, wherein the additional information contains a signed or encrypted watermark.

77. The system according to claim 67, wherein the content was encoded by a process comprising at least one selected from the group consisting of:
a steganographic process, an imperceptible encoding process, a watermarking process, a steganographic cipher process, and an information hiding process.

78. A system for identifying content, the system comprising: a receiver for receiving encoded content, wherein encoding of the encoded content comprises a steganographic mapping process that uses at least one of a plurality of keys; and a decoder, said decoder comprising at least one of (1) a CPU and non transitory memory storing a decode algorithm and () hardwired circuitry designed to execute said decode algorithm, said decoder designed to use said decode algorithm for decoding additional information from the encoded content using at least one of the plurality of keys, wherein the key is derived from the encoding process; wherein the additional information includes a watermark comprising a one way function of at least a portion of the content that contains the watermark, wherein the one way function is generated by a generator, said one way function configured to be insensitive to the encoding of the additional information; further comprising a generator for generating a one way function selected from the following group consisting of: a hash, a signature, a message digest and a certificate.

79. A system for encoding additional information into content, the system comprising:
a receiver for receiving content to be encoded; and
an encoder, said encoder comprising at least one of (1) a CPU and non transitory memory storing an encode algorithm and (2) hardwired circuitry designed to execute said encode algorithm, said encoder designed to use said encode algorithm for encoding the additional information into the content, wherein the encoding comprises a steganographic cipher process that uses at least one of a plurality of keys to generate at least one unique encoded copy of the content, and wherein the encoded additional information is unique to the encoded copy;
wherein the additional information includes an encode hash of at least a portion of the content and further comprising a generator for generating a decode hash of at least a portion of the content and comparing said encode hash to said decode hash.

80. The system according to claim 79, wherein the encoder uses at least one key to hide the additional information in at least one location in the content.

81. The system according to claim 79, wherein the encoder uses the key to map the additional information in at least one location in the content.

82. The system according to claim 79, wherein the encoder uses the key to determine the size of the additional information.

83. The system according to claim 82, wherein the size of the additional information is measured in bits.

84. The system according to claim 79, further comprising a key generator, wherein the key is derived from features of the content.

85. The system according to claim 84, wherein the key generator generates a key configured to be insensitive to the encoding process.

86. The system according to claim 79, wherein the additional information includes at least one selected from the group consisting of: the title of the encoded content, the artist of the encoded content, terms of distribution of the encoded content, rights ownership identification of the encoded content, authorship identification of the encoded content, publication rights of the encoded content, ownership identification of the encoded content, and an audit trail of the encoded content.

87. The system according to claim 79, further comprising a key generator, wherein the key is random or pseudo random.

88. The system according to claim 79, wherein the additional information includes at least one selected from the group consisting of: information for enabling use of the encoded content, meterware information for the use of the encoded content, pay-by-use information for the use of the encoded content, and payment information for access to the encoded content.

89. The system according to claim 79, wherein the additional information is encoded in at least two locations of the content; and further comprising a decoder for decoding the additional information using said key to decode said additional information from at least one of the two locations of the content.

90. The system according to claim 79, wherein said additional information does not perceptibly affect the encoded content.

91. The system according to claim 90, wherein the content comprises at least one selected from the following group consisting of: an analog waveform, discrete digital samples, a digital sample stream, and a compressed version of the encoded content.

92. The system according to claim 79, wherein the additional information contains a signed or encrypted watermark.

93. The system according to claim 79, wherein the encoder for encoding comprises at least one selected from the group consisting of: a steganographic encoder, an imperceptible encoder, a watermarking encoder, a steganographic cipher encoder, and an information hiding encoder.

94. The system according to claim 79, wherein the additional information is encoded such that tampering with the additional information causes artifacts in the encoded content.

95. The system according to claim 79, further comprising a generator for generating at least one key, wherein the key is unique to at least a portion of the additional information.

96. A system for encoding additional information into content, the system comprising:
a receiver for receiving content to be encoded; and
an encoder, said encoder comprising at least one of (1) a CPU and non transitory memory storing an encode algorithm and (2) hardwired circuitry designed to execute said encode algorithm, said encoder designed to use said encode algorithm for encoding the additional information into the content, wherein the encoding comprises a steganographic cipher process that uses at least one of a plurality of keys to generate at least one unique encoded copy of the content, and wherein the encoded additional information is unique to the encoded copy;
wherein the additional information includes a watermark comprising a one way function of at least a portion of the content that contains the watermark, wherein the one way function is generated by a generator, said one way function configured to be insensitive to the encoding of the additional information;

further comprising a generator for generating a one way function selected from the following group consisting of: a hash, a signature, a message digest and a certificate.

97. The system according to claim 96, further comprising a generator for generating a decode hash of at least a portion of the content that contains the watermark and comparing said encode hash to said decode hash.

98. A system for tamper proofing content, the system comprising:

a processor for calculating a one way function of additional information, the information comprising data to be encoded into the content and information based on the content, such that the one way function is insensitive to the changes introduced into the content by the encoding process; and an encoder, said encoder comprising at least one of (1) a CPU and non transitory memory storing an encode algorithm and (2) hardwired circuitry designed to execute said encode algorithm, said encoder designed to use said encode algorithm for encoding the additional information into the content using a mapping function that selects one or more keys from a plurality of predetermined keys, and wherein the selected key comprises information derived from the encoding process.

99. The system according to claim 98, wherein the processor calculates a one way function selected from the following group consisting of: a hash, a signature, a message digest, and a certificate.

* * * * *